United States Patent
Qiu et al.

(10) Patent No.: US 11,023,715 B2
(45) Date of Patent: Jun. 1, 2021

(54) METHOD AND APPARATUS FOR EXPRESSION RECOGNITION

(71) Applicant: ArcSoft Corporation Limited, Hangzhou (CN)

(72) Inventors: Han Qiu, Hangzhou (CN); Fang Deng, Nanjing (CN); Kangning Song, Hangzhou (CN)

(73) Assignee: ArcSoft Corporation Limited, Hangzhou (CN)

(*) Notice: Subject to any disclaimer, the term of this patent is extended or adjusted under 35 U.S.C. 154(b) by 209 days.

(21) Appl. No.: 16/045,325

(22) Filed: Jul. 25, 2018

(65) Prior Publication Data

US 2019/0034709 A1    Jan. 31, 2019
US 2019/0294866 A9    Sep. 26, 2019

(30) Foreign Application Priority Data

Jul. 25, 2017 (CN) .......................... 201710614130.8

(51) Int. Cl.
*G06K 9/00* (2006.01)
*G06T 7/593* (2017.01)
(Continued)

(52) U.S. Cl.
CPC ..... *G06K 9/00302* (2013.01); *G06K 9/00201* (2013.01); *G06K 9/00208* (2013.01);
(Continued)

(58) Field of Classification Search
None
See application file for complete search history.

(56) References Cited

U.S. PATENT DOCUMENTS

2016/0379041 A1* 12/2016 Rhee .................. G06T 19/20
                                                    382/118
2017/0160813 A1*  6/2017 Divakaran .......... G10L 15/1815
(Continued)

FOREIGN PATENT DOCUMENTS

CN    105740767 A  *  7/2016
CN    105740767 A      7/2016
(Continued)

OTHER PUBLICATIONS

Facial Expression Recognition Using Kinect Depth Sensor and Convolutional Neural Networks. Ijjina et al. Dec. 2014.*

(Continued)

*Primary Examiner* — Delomia L Gilliard
(74) *Attorney, Agent, or Firm* — Osha Bergman Watanabe & Burton LLP

(57) ABSTRACT

The present disclosure provides a method and apparatus for expression recognition, which is applied to the field of image processing. The method includes acquiring a three-dimensional image of a target face and a two-dimensional image of the target face, where the three-dimensional image includes first depth information of the target face and first color information of the target face, and the two-dimensional image includes second color information of the target face. A first neural network classifies an expression of the target face according to the first depth information, the first color information, the second color information, and a first parameter to the target face. The first parameter includes at least (Continued)

one facial expression category and first parameter data for identifying an expression category of the target facial. The disclosed method and device can accurately recognize facial expressions under different facial positions and different illumination conditions.

44 Claims, 8 Drawing Sheets

(51) Int. Cl.
| | | |
|---|---|---|
| G06T 7/30 | (2017.01) | |
| G06N 3/08 | (2006.01) | |
| G06N 3/04 | (2006.01) | |
| G06K 9/46 | (2006.01) | |
| G06N 20/10 | (2019.01) | |

(52) U.S. Cl.
CPC ..... *G06K 9/00234* (2013.01); *G06K 9/00248* (2013.01); *G06K 9/00281* (2013.01); *G06K 9/00288* (2013.01); *G06K 9/00308* (2013.01); *G06K 9/4652* (2013.01); *G06N 3/0454* (2013.01); *G06N 3/08* (2013.01); *G06N 3/082* (2013.01); *G06N 20/10* (2019.01); *G06T 7/30* (2017.01); *G06T 7/593* (2017.01); *G06T 2207/10012* (2013.01); *G06T 2207/10024* (2013.01); *G06T 2207/10028* (2013.01); *G06T 2207/20081* (2013.01); *G06T 2207/30201* (2013.01)

(56) References Cited

U.S. PATENT DOCUMENTS

| | | | |
|---|---|---|---|
| 2018/0005018 A1* | 1/2018 | Young | G06K 9/00228 |
| 2018/0158246 A1* | 6/2018 | Grau | G02B 27/0093 |
| 2018/0211102 A1* | 7/2018 | Alsmadi | G06K 9/00228 |
| 2020/0082160 A1* | 3/2020 | Li | G06N 3/02 |

FOREIGN PATENT DOCUMENTS

| | | | | |
|---|---|---|---|---|
| CN | 106778506 A | * | 5/2017 | |
| CN | 106778506 A | | 5/2017 | |
| CN | 106909905 A | * | 6/2017 | |
| CN | 106909905 A | | 6/2017 | |
| CN | 107368778 A | * | 11/2017 | |
| KR | 20110054886 A | * | 5/2011 | |
| WO | WO-2017177634 A1 | * | 10/2017 | G06T 3/00 |

OTHER PUBLICATIONS

Office Action issued in corresponding Chinese Application No. 201710614130.8, dated May 12, 2020 (43 pages).

* cited by examiner

METHOD AND APPARATUS FOR EXPRESSION RECOGNITION

CROSS-REFERENCE TO RELATED APPLICATIONS

This application claims priority to Chinese Patent Application No. 201710614130.8, filed on Jul. 26, 2017, which is hereby incorporated by reference in its entirety.

FIELD OF THE INVENTION

The present invention relates to an image processing method, and specifically, relates to a method and a device for expression recognition.

BACKGROUND OF THE INVENTION

With rapid development of artificial intelligence technology, deep learning has brought new hope to the technology and also broken a technical bottleneck. Expressions can be globally universal languages, regardless of races and nationalities. In the human-computer interaction technology, expression recognition is very important, e.g., when looking after an old man or a child, a robot can judge whether what it did just now satisfies the old man or the child via the face expression of the old man or the child, thus learning the living habit and the character of the old man or the child.

In the prior art, a face expression recognition algorithm generally adopts two-dimensional image feature extraction and a classification algorithm to classify expressions so as to obtain expression results. When the face has a certain angle or the light condition is poor, e.g., when the light is very weak or very strong, the feature information extracted via two-dimensional image features is greatly different or may be erroneous, which would lead to misjudgment of the algorithm on the expressions.

SUMMARY OF THE INVENTION

A method and a device for expression recognition, provided by the present invention, can effectively solve the problem that the face expression recognition accuracy declines due to different face postures and different light conditions.

According to a first aspect of the present invention, provided is a method for expression recognition, comprising
acquiring a three-dimensional image of a target face and a two-dimensional image of the target face, the three-dimensional image comprising first depth information of the target face and first color information of the target face, and the two-dimensional image comprising second color information of the target face;
inputting the first depth information of the target face, the first color information of the target face and the second color information of the target face to a first neural network; and
classifying expressions of the target face according to the first depth information of the target face, the first color information of the target face, the second color information of the target face and a first parameter by the first neural network, the first parameter comprising at least one face expression category and first parameter data for recognizing the expression categories of the target face.

According to the first aspect of the present invention, in a first executable mode of the first aspect of the present invention, before inputting the first depth information of the target face, the first color information of the target face and the second color information of the target face to a first neural network, the method further comprises:
performing the same first processing on the three-dimensional image of the target face and the two-dimensional image of the target face, the first processing comprising at least one of:
determining feature points of the three-dimensional image of the target face and the two-dimensional image of the target face, and rotating the three-dimensional image of the target face and the two-dimensional image of the target face based on the feature points;
performing mirroring, linear transformation and affine transformation on the three-dimensional image of the target face and the two-dimensional image of the target face;
aligning the feature points of the three-dimensional image of the target face and the two-dimensional image of the target face with a set position;
performing contrast stretching on the three-dimensional image of the target face and the two-dimensional image of the target face; and
performing image pixel value normalization processing on the three-dimensional image of the target face and the two-dimensional image of the target face.

According to the first executable mode of the first aspect of the present invention, in a second executable mode of the first aspect of the present invention, performing image pixel value normalization processing on the three-dimensional image of the target face and the two-dimensional image of the target face comprises:
normalizing pixel values of channels of the three-dimensional image of the target face and the two-dimensional image of the target face from [0, 255] to [0, 1].

According to the first aspect of the present invention and the first executable mode or the second executable mode of the first aspect of the present invention, in a third executable mode of the first aspect of the present invention, the first parameter data for recognizing the expression categories of the target face is obtained by training three-dimensional images of multiple face expression samples and two-dimensional images of the face expression samples via the first neural network;
the three-dimensional images of the face expression samples comprise second depth information of the face expression samples and third color information of the face expression samples; and
the two-dimensional images of the face expression samples comprise fourth color information of the face expression samples.

According to the third executable mode of the first aspect of the present invention, in a fourth executable mode of the first aspect of the present invention, before the three-dimensional images of the multiple face expression samples and the two-dimensional images of the face expression samples are trained via the first neural network, the method further comprises:
performing the same second processing on the three-dimensional images of the face expression samples and the two-dimensional images of the face expression samples, the second processing comprising at least one of:
determining feature points of the three-dimensional images of the face expression samples and the two-dimensional images of the face expression samples, and rotating the three-dimensional images of the face expression samples and the two-dimensional images of the face expression samples based on the feature points;

performing mirroring, linear transformation and affine transformation on the three-dimensional images of the face expression samples and the two-dimensional images of the face expression samples;

aligning the feature points of the three-dimensional images of the face expression samples and the two-dimensional images of the face expression samples with a set position;

performing contrast stretching on the three-dimensional images of the face expression samples and the two-dimensional images of the face expression samples; and performing image pixel value normalization processing on the three-dimensional images of the face expression samples and the two-dimensional images of the face expression samples.

According to the fourth executable mode of the first aspect of the present invention, in a fifth executable mode of the first aspect of the present invention, performing image pixel value normalization processing on the three-dimensional images of the face expression samples and the two-dimensional images of the face expression samples comprises:

normalizing pixel values of channels of the three-dimensional images of the face expression samples and the two-dimensional images of the face expression samples from [0, 255] to [0, 1].

According to the fourth or fifth executable mode of the first aspect of the present invention, in a sixth executable mode of the first aspect of the present invention, each of the face expression samples satisfies (belongs to) at least one of the following face expression categories: fear, sadness, joy, anger, disgust, surprise, nature and contempt;

each of the face expression sample, the second depth information of the face expression sample, the third color information of the face expression sample and the fourth color information of the face expression sample satisfy (belong to) the same face expression category.

According to the first aspect of the present invention and any of the first to sixth executable modes of the first aspect of the present invention, in a seventh executable mode of the first aspect of the present invention, the face expression categories included by the first neural network comprise at least one of: fear, sadness, joy, anger, disgust, surprise, nature and contempt.

According to any of the first to seventh executable modes of the first aspect of the present invention, in an eighth executable mode of the first aspect of the present invention, the feature points are eye points.

According to the first aspect of the present invention and any of the first to eighth executable modes of the first aspect of the present invention, in a ninth executable mode of the first aspect of the present invention, the first neural network comprises a first convolutional neural network.

According to the ninth executable mode of the first aspect of the present invention, in a tenth executable mode of the first aspect of the present invention, the first convolutional neural network comprises four convolutional layers, four down-sampling layers, one dropout layer and two fully-connected layers.

According to the first aspect of the present invention and any of the first to tenth executable modes of the first aspect of the present invention, in an eleventh executable mode of the first aspect of the present invention, the first color information and the second color information are images of an RGB format or a YUV format.

According to any of the third to eleventh executable modes of the first aspect of the present invention, in a twelfth executable mode of the first aspect of the present invention, the third color information and the fourth color information are images of an RGB format or a YUV format.

According to a second aspect provided by the present invention, provided is a device for expression recognition, comprising:

a first acquisition module, configured to acquire a three-dimensional image of a target face and a two-dimensional image of the target face, the three-dimensional image comprising first depth information of the target face and first color information of the target face, and the two-dimensional image comprising second color information of the target face;

a first input module, configured to input the first depth information of the target face, the first color information of the target face and the second color information of the target face to a first neural network; and the first neural network, configured to classify expressions of the target face according to the first depth information of the target face, the first color information of the target face, the second color information of the target face and a first parameter, the first parameter comprising at least one face expression category and first parameter data for recognizing the expression categories of the target face.

According to the second aspect of the present invention, in a first executable mode of the second aspect of the present invention, the device further comprises a first processing module, the first processing module is configured to perform the same first processing on the three-dimensional image of the target face and the two-dimensional image of the target face, and input the three-dimensional image of the target face and the two-dimensional image of the target face subjected to the first processing to the first input module;

the first processing module comprises at least one of the following sub-modules: a first rotating sub-module, a first transformation sub-module, a first alignment sub-module, a first contrast stretching sub-module and a first normalization processing sub-module;

the first rotating sub-module is configured to determine feature points of the three-dimensional image of the target face and the two-dimensional image of the target face, and rotate the three-dimensional image of the target face and the two-dimensional image of the target face based on the feature points;

the first transformation sub-module is configured to perform mirroring, linear transformation and affine transformation on the three-dimensional image of the target face and the two-dimensional image of the target face;

the first alignment sub-module is configured to align the feature points of the three-dimensional image of the target face and the two-dimensional image of the target face with a set position;

the first contrast stretching sub-module is configured to perform contrast stretching on the three-dimensional image of the target face and the two-dimensional image of the target face; and the first normalization processing sub-module is configured to perform image pixel value normalization processing on the three-dimensional image of the target face and the two-dimensional image of the target face.

According to the first executable mode of the second aspect of the present invention, in a second executable mode of the second aspect of the present invention, the first normalization processing sub-module is specifically configured to normalize pixel values of channels of the three-dimensional image of the target face and the two-dimensional image of the target face from [0, 255] to [0, 1].

According to the second aspect of the present invention and the first or second executable mode of the second aspect of the present invention, in a third executable mode of the second aspect of the present invention, the first parameter data for recognizing the expression categories of the target face is obtained by training three-dimensional images of multiple face expression samples and two-dimensional images of the face expression samples via the first neural network;

the three-dimensional images of the face expression samples comprise second depth information of the face expression samples and third color information of the face expression samples; and the two-dimensional images of the face expression samples comprise fourth color information of the face expression samples.

According to the third executable mode of the second aspect of the present invention, in a fourth executable mode of the second aspect of the present invention, the device further comprises a second processing module, the second processing module is configured to perform the same second processing on the three-dimensional images of the face expression samples and the two-dimensional images of the face expression samples, and input the three-dimensional images of the face expression samples and the two-dimensional images of the face expression samples subjected to the second processing to the first input module;

the second processing module comprises a second rotating sub-module, a second transformation sub-module, a second alignment sub-module, a second contrast stretching sub-module and a second normalization processing sub-module;

the second rotating sub-module is configured to determine feature points of the three-dimensional images of the face expression samples and the two-dimensional images of the face expression samples, and rotate the three-dimensional images of the face expression samples and the two-dimensional images of the face expression samples based on the feature points;

the second transformation sub-module is configured to perform mirroring, linear transformation and affine transformation on the three-dimensional images of the face expression samples and the two-dimensional images of the face expression samples;

the second alignment sub-module is configured to align the feature points of the three-dimensional images of the face expression samples and the two-dimensional images of the face expression samples with a set position;

the second contrast stretching sub-module is configured to perform contrast stretching of images on the three-dimensional images of the face expression samples and the two-dimensional images of the face expression samples; and the second normalization processing sub-module is configured to perform image pixel value normalization processing on the three-dimensional images of the face expression samples and the two-dimensional images of the face expression samples.

According to the fourth executable mode of the second aspect of the present invention, in a fifth executable mode of the second aspect of the present invention, the second normalization processing sub-module is specifically configured to normalize pixel values of channels of the three-dimensional images of the face expression samples and the two-dimensional images of the face expression samples from [0, 255] to [0, 1].

According to any of the third to fifth executable modes of the second aspect of the present invention, in a sixth executable mode of the second aspect of the present invention, each of the face expression samples satisfies (belongs to) at least one of the following face expression categories: fear, sadness, joy, anger, disgust, surprise, nature and contempt;

each of the face expression samples, the second depth information of the face expression sample, the second color information of the face expression sample and the third color information of the face expression sample satisfy (belong to) the same face expression category.

According to the second aspect of the present invention and any of the first to sixth executable mode of the second aspect of the present invention, in a seventh executable mode of the second aspect of the present invention, the face expression categories included by the first neural network comprise at least one of: fear, sadness, joy, anger, disgust, surprise, nature and contempt.

According to the second aspect of the present invention and any of the first to seventh executable mode of the second aspect of the present invention, in an eighth executable mode of the second aspect of the present invention, the feature points are eye points.

According to the second aspect of the present invention and any of the first to eighth executable mode of the second aspect of the present invention, in a ninth executable mode of the second aspect of the present invention, the first neural network comprises a first convolutional neural network.

According to the ninth executable mode of the second aspect of the present invention, in a tenth executable mode of the second aspect of the present invention, the first convolutional neural network comprises four convolutional layers, four down-sampling layers, one dropout layer and two fully-connected layers.

According to the second aspect of the present invention and any of the first to tenth executable mode of the second aspect of the present invention, in an eleventh executable mode of the second aspect of the present invention, the first color information and the second color information are images of an RGB format or a YUV format.

According to any of the third to eleventh executable modes of the second aspect of the present invention, in a twelfth executable mode of the second aspect of the present invention, the third color information and the fourth color information are images of an RGB format or a YUV format.

According to a third aspect of the present invention, provided is a method for expression recognition, comprising:

acquiring a three-dimensional image of a target face, the three-dimensional image comprising third depth information of the target face and fifth color information of the target face;

inputting the third depth information of the target face to a second neural network and inputting the fifth color information of the target face to a third neural network;

classifying expressions of the target face according to the third depth information of the target face and a second parameter and outputting first classification data by the second neural network, and classifying expressions of the target face according to the fifth color information of the target face and a third parameter and outputting second classification data by the third neural network, the second parameter comprising at least one face expression category and second parameter data for recognizing the expression categories of the target face, and the third parameter comprising the at least one face expression category and third parameter data for recognizing the expression categories of the target face; and outputting classification results on the expressions of the target face according to the first classification data and the second classification data.

According to the third aspect of the present invention, in a first executable mode of the third aspect of the present invention, outputting classification results on the expressions of the target face according to the first classification data and the second classification data comprises:

inputting the first classification data and the second classification data and outputting classification results on the expressions of the target face according to the first classification data, the second classification data and support vector machine parameter data by a support vector machine, the support vector machine comprising the at least one face expression category and the support vector machine parameter data for recognizing the expression category of the target face.

According to the third aspect of the present invention or the first executable mode of the third aspect of the present invention, in a second executable mode of the third aspect of the present invention, before inputting the third depth information of the target face to a second neural network and inputting the fifth color information of the target face to a third neural network, the method further comprises:

performing third processing on the third depth information of the target face, the third processing comprising at least one of:

determining feature points of the third depth information of the target face, and rotating the third depth information of the target face based on the feature points;

performing mirroring, linear transformation and affine transformation on the third depth information of the target face;

aligning the feature points of the third depth information of the target face with a set position;

performing contrast stretching on the third depth information of the target face; and performing image pixel value normalization processing on the third depth information of the target face; or before inputting the third depth information of the target face to a second neural network and inputting the fifth color information of the target face to a third neural network, the method further comprises:

performing the same third processing on the third depth information of the target face and the fifth color information of the target face, the third processing comprising at least one of:

determining feature points of the third depth information of the target face and feature points of the fifth color information of the target face, and rotating the third depth information of the target face and the fifth color information of the target face based on the feature points;

performing mirroring, linear transformation and affine transformation on the third depth information of the target face and the fifth color information of the target face;

aligning the feature points of the third depth information of the target face and the fifth color information of the target face with a set position;

performing contrast stretching on the third depth information of the target face or the fifth color information of the target face; and performing image pixel value normalization processing on the third depth information of the target face and the fifth color information of the target face.

According to the second executable mode of the third aspect of the present invention, in a third executable mode of the third aspect of the present invention, performing image pixel value normalization processing on the third depth information of the target face comprises:

normalizing pixel values of the third depth information of the target face from [0, 255] to [0, 1]; or performing image pixel value normalization processing on the third depth information of the target face and the fifth color information of the target face comprises:

normalizing pixel values of channels of the third depth information of the target face and the fifth color information of the target face from [0, 255] to [0, 1].

According to the third aspect of the present invention or any of the first to third executable modes of the third aspect of the present invention, in a fourth executable mode of the third aspect of the present invention, the second parameter data is obtained by training fourth depth information of multiple face expression samples via the second neural network; and the third parameter data is obtained by training sixth color information of the multiple face expression samples via the third neural network.

According to the fourth executable mode of the third aspect of the present invention, in a fifth executable mode of the third aspect of the present invention, before the fourth depth information of the multiple face expression samples is trained via the second neural network, the method further comprises:

performing fourth processing on the fourth depth information of the face expression samples, the fourth processing comprising at least one of:

determining feature points of the fourth depth information of the face expression samples, and rotating the fourth depth information of the face expression samples based on the feature points;

performing mirroring, linear transformation and affine transformation on the fourth depth information of the face expression samples;

aligning the feature points of the fourth depth information of the face expression samples with a set position;

performing contrast stretching on the fourth depth information of the face expression samples; and performing image pixel value normalization processing on the fourth depth information of the face expression samples;

or, before the fourth depth information of the face expression samples is trained via the second neural network and the sixth color information of the face expression samples is trained via the third neural network, the method further comprises:

performing the same fourth processing on the fourth depth information of the face expression samples and the sixth color information of the face expression samples, the fourth processing comprising at least one of:

determining feature points of the fourth depth information of the face expression samples and feature points of the sixth color information of the face expression samples, and rotating the fourth depth information of the face expression samples and the sixth color information of the face expression samples based on the feature points;

performing mirroring, linear transformation and affine transformation on the fourth depth information of the face expression samples and the sixth color information of the face expression samples;

aligning the feature points of the fourth depth information of the face expression samples and the sixth color information of the face expression samples with a set position;

performing contrast stretching on the fourth depth information of the face expression samples and the sixth color information of the face expression samples; and performing image pixel value normalization processing on the fourth depth information of the face expression samples and the sixth color information of the face expression samples.

According to the fifth executable mode of the third aspect of the present invention, in a sixth executable mode of the third aspect of the present invention, performing image pixel value normalization processing on the fourth depth information of the face expression samples comprises:

normalizing pixel values of the fourth depth information of the face expression samples from [0, 255] to [0, 1]; or performing image pixel value normalization processing on the fourth depth information of the face expression samples and the sixth color information of the face expression samples comprises:

normalizing pixel values of channels of the fourth depth information of the face expression samples and the sixth color information of the face expression samples from [0, 255] to [0, 1].

According to any of the fourth to sixth executable modes of the third aspect of the present invention, in a seventh executable mode of the third aspect of the present invention, the support vector machine parameter data for recognizing the expression category of the target face is obtained by: training the second neural network with the fourth depth information of the facial expression samples, training the third neural network with the sixth color information of the facial expression samples, combining corresponding output data from the second fully-connected layer of the second neural network and the second fully-connected layer of the third neural network as inputs, and training the support vector machine with the inputs and corresponding expression labels of the facial expression samples.

According to any of the fourth to seventh executable modes of the third aspect of the present invention, in an eighth executable mode of the third aspect of the present invention, each of the face expression sample satisfies (belongs to) at least one of the following face expression categories: fear, sadness, joy, anger, disgust, surprise, nature and contempt; and each of the face expression samples, the fourth depth information of the face expression sample and the sixth color information of the face expression sample satisfy (belong to) the same face expression category.

According to the third aspect of the present invention and any of the first to eighth executable modes of the third aspect of the present invention, in a ninth executable mode of the third aspect of the present invention, the face expression categories included by the second neural network and the face expression categories included by the third neural network include at least one of: fear, sadness, joy, anger, disgust, surprise, nature and contempt.

According to any of the second to ninth executable modes of the third aspect of the present invention, in a tenth executable mode of the third aspect of the present invention, the feature points are eye points.

According to the third aspect of the present invention and any of the first to tenth executable modes of the third aspect of the present invention, in an eleventh executable mode of the third aspect of the present invention, the second neural network comprises a second convolutional neural network, and the third neural network comprises a third convolutional neural network.

According to the eleventh executable mode of the third aspect of the present invention, in a twelfth executable mode of the third aspect of the present invention, the second convolutional neural network comprises three convolutional layers, three down-sampling layers, one dropout layer and two fully-connected layers; and the third convolutional neural network comprises four convolutional layers, four down-sampling layers, one dropout layer and two fully-connected layers.

According to the third aspect of the present invention and any of the first to twelfth executable modes of the third aspect of the present invention, in a thirteenth executable mode of the third aspect of the present invention, the fifth color information is an image of an RGB format or a YUV format.

According to the third aspect of the present invention and any of the fourth to thirteenth executable modes of the third aspect of the present invention, in a fourteenth executable mode of the third aspect of the present invention, the sixth color information is images of an RGB format or a YUV format.

According to a fourth aspect of the present invention, provided is a device for expression recognition, comprising a second acquisition module, a second input module, a second neural network, a third neural network and a second classification module, wherein the second acquisition module is configured to acquire a three-dimensional image of a target face, the three-dimensional image comprising third depth information of the target face and fifth color information of the target face;

the second input module is configured to input the third depth information of the target face to the second neural network and input the fifth color information of the target face to the third neural network;

the second neural network is configured to classify expressions of the target face according to the third depth information of the target face and a second parameter and output first classification data, and the third neural network is configured to classify expressions of the target face according to the fifth color information of the target face and a third parameter and output second classification data, the second parameter comprising at least one face expression category and second parameter data for recognizing the expression categories of the target face, and the third parameter comprising the at least one face expression category and third parameter data for recognizing the expression categories of the target face; and the second classification module is configured to output classification results on the expressions of the target face according to the first classification data and the second classification data.

According to the fourth aspect of the present invention, in a first executable mode of the fourth aspect of the present invention, the second classification module comprises a support vector machine, and the support vector machine is configured to input the first classification data and the second classification data, and output the classification results on the expressions of the target face according to the first classification data, the second classification data and support vector machine parameter data, the support vector machine comprising the at least one face expression category and the support vector machine parameter data for recognizing the expression category of the target face.

According to the fourth aspect of the present invention and the first executable mode of the fourth aspect of the present invention, in a second executable mode of the fourth aspect of the present invention, the device further comprises a third processing module, the third processing module is configured to perform third processing on the third depth information of the target face, and input the third depth information of the target face subjected to the third processing to the second input module;

the third processing module comprises at least one of a third rotating sub-module, a third transformation sub-module, a third alignment sub-module, a third contrast stretching sub-module and a third normalization processing sub-module;

the third rotating sub-module is configured to determine feature points of the third depth information of the target face, and rotate the third depth information of the target face based on the feature points;

the third transformation sub-module is configured to perform mirroring, linear transformation and affine transformation on the third depth information of the target face;

the third alignment sub-module is configured to align the feature points of the third depth information of the target face with a set position;

the third contrast stretching sub-module is configured to perform contrast stretching on the third depth information of the target face; and the third normalization processing sub-module is configured to perform image pixel value normalization processing on the third depth information of the target face;

or, the third processing module is further configured to perform the same third processing on the third depth information of the target face and the fifth color information of the target face, and input the third depth information of the target face and the fifth color information of the target face subjected to the third processing to the second input module;

the third rotating sub-module is further configured to determine feature points of the third depth information of the target face and feature points of the fifth color information of the target face, and rotate the third depth information of the target face and the fifth color information of the target face based on the feature points;

the third transformation sub-module is further configured to perform mirroring, linear transformation and affine transformation on the third depth information of the target face and the fifth color information of the target face;

the third alignment sub-module is further configured to align the feature points of the third depth information of the target face and the fifth color information of the target face with a set position;

the third contrast stretching sub-module is further configured to perform contrast stretching on the third depth information of the target face or the fifth color information of the target face; and the third normalization processing sub-module is further configured to perform image pixel value normalization processing on the third depth information of the target face and the fifth color information of the target face.

According to the second executable mode of the fourth aspect of the present invention, in a third executable mode of the fourth aspect of the present invention, the third normalization processing sub-module is specifically configured to normalize pixel values of the third depth information of the target face from [0, 255] to [0, 1];

or, the third normalization processing sub-module is specifically configured to normalize pixel values of channels of the third depth information of the target face and the fifth color information of the target face from [0, 255] to [0, 1].

According to the fourth aspect of the present invention and the first to third executable modes of the fourth aspect of the present invention, in a fourth executable mode of the fourth aspect of the present invention, the second parameter data is obtained by training fourth depth information of multiple face expression samples via the second neural network; and the third parameter data is obtained by training sixth color information of the multiple face expression samples via the third neural network.

According to the fourth executable mode of the fourth aspect of the present invention, in a fifth executable mode of the fourth aspect of the present invention, the device comprises a fourth processing module, the fourth processing module is configured to perform fourth processing on the fourth depth information of the face expression samples, and input the fourth depth information of the face expression samples subjected to the fourth processing to the second input module;

the fourth processing module comprises at least one of a fourth rotating sub-module, a fourth transformation sub-module, a fourth alignment sub-module, a fourth contrast stretching sub-module and a fourth normalization processing sub-module;

the fourth rotating sub-module is configured to determine feature points of the fourth depth information of the face expression samples, and rotate the fourth depth information of the face expression samples based on the feature points;

the fourth transformation sub-module is configured to perform mirroring, linear transformation and affine transformation on the fourth depth information of the face expression samples;

the fourth alignment sub-module is configured to align the feature points of the fourth depth information of the face expression samples with a set position;

the fourth contrast stretching sub-module is configured to perform contrast stretching on the fourth depth information of the face expression samples; and the fourth normalization processing sub-module is configured to perform image pixel value normalization processing on the fourth depth information of the face expression samples;

or, the fourth processing module is further configured to perform fourth processing on the fourth depth information of the face expression samples and the sixth color information of the face expression samples, and input the fourth depth information of the face expression samples and the sixth color information of the face expression samples subjected to the fourth processing to the second input module;

the fourth rotating sub-module is further configured to determine feature points of the fourth depth information of the face expression samples and feature points of the sixth color information of the face expression samples, and rotate the fourth depth information of the face expression samples and the sixth color information of the face expression samples based on the feature points;

the fourth transformation sub-module is further configured to perform mirroring, linear transformation and affine transformation on the fourth depth information of the face expression samples and the sixth color information of the face expression samples;

the fourth alignment sub-module is further configured to align the feature points of the fourth depth information of the face expression samples and the sixth color information of the face expression samples with a set position;

the fourth contrast stretching sub-module is further configured to perform contrast stretching on the fourth depth information of the face expression samples or the sixth color information of the face expression samples; and the fourth normalization processing sub-module is further configured to perform image pixel value normalization processing on the fourth depth information of the face expression samples and the sixth color information of the face expression samples.

According to the fifth executable mode of the fourth aspect of the present invention, in a sixth executable mode of the fourth aspect of the present invention, the fourth normalization processing sub-module is specifically configured to normalize pixel values of the fourth depth information of the face expression samples from [0, 255] to [0, 1];

or, the fourth normalization processing sub-module is specifically configured to normalize pixel values of channels of the fourth depth information of the face expression samples and the sixth color information of the face expression samples from [0, 255] to [0, 1].

According to any of the fourth to sixth executable modes of the fourth aspect of the present invention, in a seventh executable mode of the fourth aspect of the present invention, the support vector machine parameter data for recognizing the expression category of the target face is obtained by: training the second neural network with the fourth depth information of the facial expression samples, training the third neural network with the sixth color information of the facial expression samples, combining corresponding output data from the second fully-connected layer of the second neural network and the second fully-connected layer of the third neural network as inputs, and training the support vector machine with the inputs and corresponding expression labels of the facial expression samples.

According to any of the fourth to seventh executable modes of the fourth aspect of the present invention, in an eighth executable mode of the fourth aspect of the present invention, each of the face expression samples satisfies (belongs to) at least one of the following face expression categories: fear, sadness, joy, anger, disgust, surprise, nature and contempt; and each of the face expression samples, the fourth depth information of the face expression sample and the sixth color information of the face expression sample satisfy (belong to) the same face expression category.

According to the fourth aspect of the present invention and any of the first to eighth executable modes of the fourth aspect of the present invention, in a ninth executable mode of the fourth aspect of the present invention, the face expression categories included by the second neural network and the face expression categories included by the third neural network comprise at least one of: fear, sadness, joy, anger, disgust, surprise, nature and contempt.

According to any of the second to ninth executable modes of the fourth aspect of the present invention, in a tenth executable mode of the fourth aspect of the present invention, the feature points are eye points.

According to the fourth aspect of the present invention and any of the first to tenth executable modes of the fourth aspect of the present invention, in an eleventh executable mode of the fourth aspect of the present invention, the second neural network comprises a second convolutional neural network, and the third neural network comprises a third convolutional neural network.

According to the eleventh executable mode of the fourth aspect of the present invention, in a twelfth executable mode of the fourth aspect of the present invention, the second convolutional neural network comprises three convolutional layers, three down-sampling layers, one dropout layer and two fully-connected layers; and the third convolutional neural network comprises four convolutional layers, four down-sampling layers, one dropout layer and two fully-connected layers.

According to the fourth aspect of the present invention and the first to twelfth executable modes of the fourth aspect of the present invention, in a thirteenth executable mode of the fourth aspect of the present invention, the fifth color information is an image of an RGB format or a YUV format.

According to the fourth to thirteenth executable modes of the fourth aspect of the present invention, in a fourteenth executable mode of the fourth aspect of the present invention, the sixth color information is images of an RGB format or a YUV format.

According to a fifth aspect of the present invention, provided is a method for expression recognition, comprising acquiring a three-dimensional image of a target face, the three-dimensional image comprising fifth depth information of the target face and seventh color information of the target face;

inputting the fifth depth information of the target face and the seventh color information of the target face to a fourth neural network; and classifying expressions of the target face according to the fifth depth information of the target face, the seventh color information of the target face and a fourth parameter by the fourth neural network, the fourth parameter comprising at least one face expression category and fourth parameter data for recognizing the expression categories of the target face.

According to the fifth aspect of the present invention, in a first executable mode of the fifth aspect of the present invention, before inputting the fifth depth information of the target face and the seventh color information of the target face to a fourth neural network, the method further comprises:

performing fifth processing on the three-dimensional image of the target face, the fifth processing comprising at least one of:

determining feature points of the three-dimensional image of the target face, and rotating the three-dimensional image of the target face based on the feature points;

performing mirroring, linear transformation and affine transformation on the three-dimensional image of the target face;

aligning the feature points of the three-dimensional image of the target face with a set position;

performing contrast stretching on the three-dimensional image of the target face; and performing image pixel value normalization processing on the three-dimensional image of the target face.

According to the first executable mode of the fifth aspect of the present invention, in a second executable mode of the fifth aspect of the present invention, the image pixel value normalization processing on the three-dimensional image of the target face comprises:

normalizing pixel values of channels of the three-dimensional image of the target face from [0, 255] to [0, 1].

According to the fifth aspect of the present invention and the first or second executable mode of the fifth aspect of the present invention, in a third executable mode of the fifth aspect of the present invention, the fourth parameter data is obtained by training three-dimensional images of multiple face expression samples via the fourth neural network; and the three-dimensional images of the face expression samples comprise sixth depth information of the face expression samples and eighth color information of the face expression samples.

According to the third executable mode of the fifth aspect of the present invention, in a fourth executable mode of the fifth aspect of the present invention, before the three-dimensional images of the multiple face expression samples are trained via the fourth neural network, the method further comprises:

performing sixth processing on the three-dimensional images of the face expression samples, the sixth processing comprising at least one of:

determining feature points of the three-dimensional images of the face expression samples, and rotating the three-dimensional images of the face expression samples based on the feature points;

performing mirroring, linear transformation and affine transformation on the three-dimensional images of the face expression samples;

aligning the feature points of the three-dimensional images of the face expression samples with a set position;

performing contrast stretching on the three-dimensional images of the face expression samples; and performing image pixel value normalization processing on the three-dimensional images of the face expression samples.

According to the fourth executable mode of the fifth aspect of the present invention, in a fifth executable mode of the fifth aspect of the present invention, the image pixel value normalization processing on the three-dimensional images of the face expression samples comprises:

normalizing pixel values of channels of the three-dimensional images of the face expression samples from [0, 255] to [0, 1].

According to any of the third to fifth executable modes of the fifth aspect of the present invention, in a sixth executable mode of the fifth aspect of the present invention, each of the face expression samples satisfies (belongs to) at least one of the following face expression categories: fear, sadness, joy, anger, disgust, surprise, nature and contempt; and each of the face expression samples, the sixth depth information of the face expression sample and the eighth color information of the face expression sample satisfy (belong to) the same face expression category.

According to the fifth aspect of the present invention and any of the first to sixth executable modes of the fifth aspect of the present invention, in a seventh executable mode of the fifth aspect of the present invention, the face expression categories included by the fourth neural network comprise at least one of: fear, sadness, joy, anger, disgust, surprise, nature and contempt.

According to any of the first to seventh executable modes of the fifth aspect of the present invention, in an eighth executable mode of the fifth aspect of the present invention, the feature points are eye points.

According to the fifth aspect of the present invention and any of the first to eighth executable modes of the fifth aspect of the present invention, in a ninth executable mode of the fifth aspect of the present invention, the fourth neural network comprises a fourth convolutional neural network.

According to the ninth executable mode of the fifth aspect of the present invention, in a tenth executable mode of the fifth aspect of the present invention, the fourth convolutional neural network comprises one segmentation layer, eight convolutional layers, eight down-sampling layers, two dropout layers and five fully-connected layers.

According to the fifth aspect of the present invention and the first to tenth executable modes of the fifth aspect of the present invention, in an eleventh executable mode of the fifth aspect of the present invention, the seventh color information is an image of an RGB format or a YUV format.

According to the third to eleventh executable modes of the fifth aspect of the present invention, in a twelfth executable mode of the fifth aspect of the present invention, the eighth color information is images of an RGB format or a YUV format.

According to a sixth aspect of the present invention, provided is a device for expression recognition, comprising:

a third acquisition module, configured to acquire a three-dimensional image of a target face, the three-dimensional image comprising fifth depth information of the target face and seventh color information of the target face;

a third input module, configured to input the fifth depth information of the target face and the seventh color information of the target face to a fourth neural network; and the fourth neural network, configured to classify expressions of the target face according to the fifth depth information of the target face, the seventh color information of the target face and a fourth parameter, the fourth parameter comprising at least one face expression category and fourth parameter data for recognizing the expression categories of the target face.

According to the sixth aspect of the present invention, in a first executable mode of the sixth aspect of the present invention, the device further comprises a fifth processing module, the fifth processing module is configured to perform fifth processing on the three-dimensional image of the target face, and input the three-dimensional image of the target face subjected to the fifth processing to the third input module;

the fifth processing module comprises at least one of the following sub-modules: a fifth rotating sub-module, a fifth transformation sub-module, a fifth alignment sub-module, a fifth contrast stretching sub-module and a fifth normalization processing sub-module;

the fifth rotating sub-module is configured to determine feature points of the three-dimensional image of the target face, and rotate the three-dimensional image of the target face based on the feature points;

the fifth transformation sub-module is configured to perform mirroring, linear transformation and affine transformation on the three-dimensional image of the target face;

the fifth alignment sub-module is configured to align the feature points of the three-dimensional image of the target face with a set position;

the fifth contrast stretching sub-module is configured to perform contrast stretching on the three-dimensional image of the target face; and the fifth normalization processing sub-module is configured to perform image pixel value normalization processing on the three-dimensional image of the target face.

According to the first executable mode of the sixth aspect of the present invention, in a second executable mode of the sixth aspect of the present invention, the fifth normalization processing sub-module is specifically configured to normalize pixel values of channels of the three-dimensional image of the target face from [0, 255] to [0, 1].

According to the sixth aspect of the present invention and the first or second executable mode of the sixth aspect of the present invention, in a third executable mode of the sixth aspect of the present invention, the fourth parameter data for recognizing the expression categories of the target face is obtained by training three-dimensional images of multiple face expression samples via the fourth neural network; and the three-dimensional images of the face expression samples comprise sixth depth information of the face expression samples and eighth color information of the face expression samples.

According to the third executable mode of the sixth aspect of the present invention, in a fourth executable mode of the sixth aspect of the present invention, the device further comprises a sixth processing module, the sixth processing module is configured to perform fifth processing on the three-dimensional images of the face expression samples, and input the three-dimensional images of the face expression samples subjected to the fifth processing to the third input module;

the sixth processing module comprises a sixth rotating sub-module, a sixth transformation sub-module, a sixth alignment sub-module, a sixth contrast stretching sub-module and a sixth normalization processing sub-module;

the sixth rotating sub-module is configured to determine feature points of the three-dimensional images of the face expression samples, and rotate the three-dimensional images of the face expression samples based on the feature points;

the sixth transformation sub-module is configured to perform mirroring, linear transformation and affine transformation on the three-dimensional images of the face expression samples;

the sixth alignment sub-module is configured to align the feature points of the three-dimensional images of the face expression samples with a set position;

the sixth contrast stretching sub-module is configured to perform contrast stretching on the three-dimensional images of the face expression samples; and the sixth normalization processing sub-module is configured to perform image pixel value normalization processing on the three-dimensional images of the face expression samples.

According to the fourth executable mode of the sixth aspect of the present invention, in a fifth executable mode of the sixth aspect of the present invention, the sixth normalization processing sub-module is specifically configured to normalize pixel values of channels of the three-dimensional images of the face expression samples from [0, 255] to [0, 1].

According to any of the third to fifth executable modes of the sixth aspect of the present invention, in a sixth executable mode of the sixth aspect of the present invention, each of the face expression samples satisfies (belongs to) at least one of the following face expression categories: fear, sadness, joy, anger, disgust, surprise, nature and contempt; and each of the face expression samples, the sixth depth information of the face expression sample and the eighth color information of the face expression sample satisfy (belong to) the same face expression category.

According to the sixth aspect of the present invention and any of the first to sixth executable modes of the sixth aspect of the present invention, in a seventh executable mode of the sixth aspect of the present invention, the face expression categories included by the fourth neural network comprise at least one of: fear, sadness, joy, anger, disgust, surprise, nature and contempt.

According to any of the first to seventh executable modes of the sixth aspect of the present invention, in an eighth executable mode of the sixth aspect of the present invention, the feature points are eye points.

According to the sixth aspect of the present invention and any of the first to eighth executable modes of the sixth aspect of the present invention, in a ninth executable mode of the sixth aspect of the present invention, the fourth neural network comprises a fourth convolutional neural network.

According to the ninth executable mode of the sixth aspect of the present invention, in a tenth executable mode of the sixth aspect of the present invention, the fourth convolutional neural network comprises one segmentation layer, eight convolutional layers, eight down-sampling layers, two dropout layers and five fully-connected layers.

According to the sixth aspect of the present invention and any of the first to tenth executable modes of the sixth aspect of the present invention, in an eleventh executable mode of the sixth aspect of the present invention, the seventh color information is an image of an RGB format or a YUV format.

According to any of the third to eleventh executable modes of the sixth aspect of the present invention, in a twelfth executable mode of the sixth aspect of the present invention, the eighth color information is images of an RGB format or a YUV format.

According to a seventh aspect of the present invention, provided is a computer readable storage medium, which stores a computer program, wherein the computer program, when executed by a first processor, implements the steps in any executable mode of the first aspect of the present invention and the first to twelfth executable modes of the first aspect of the present invention, the third aspect of the present invention and the first to fourteenth executable modes of the third aspect of the present invention, and the fifth aspect of the present invention and the first to twelfth executable modes of the fifth aspect of the present invention.

According to an eighth aspect of the present invention, provided is a device for expression recognition, comprising a memory, a second processor and a computer program which is stored in the memory and can be run on the second processor, wherein the computer program, when executed by the second processor, implements the steps in any executable mode of the first aspect of the present invention and the first to twelfth executable modes of the first aspect of the present invention, the third aspect of the present invention and the first to fourteenth executable modes of the third aspect of the present invention, and the fifth aspect of the present invention and the first to twelfth executable modes of the fifth aspect of the present invention.

The method and device for expression recognition, provided by the present invention, can effectively solve the problem that the face expression recognition accuracy declines due to different face postures and different light conditions, and improve the accuracy of face expression recognition of the target face at different face postures and in different light conditions.

DETAILED DESCRIPTION OF THE EMBODIMENTS

Figure 1:
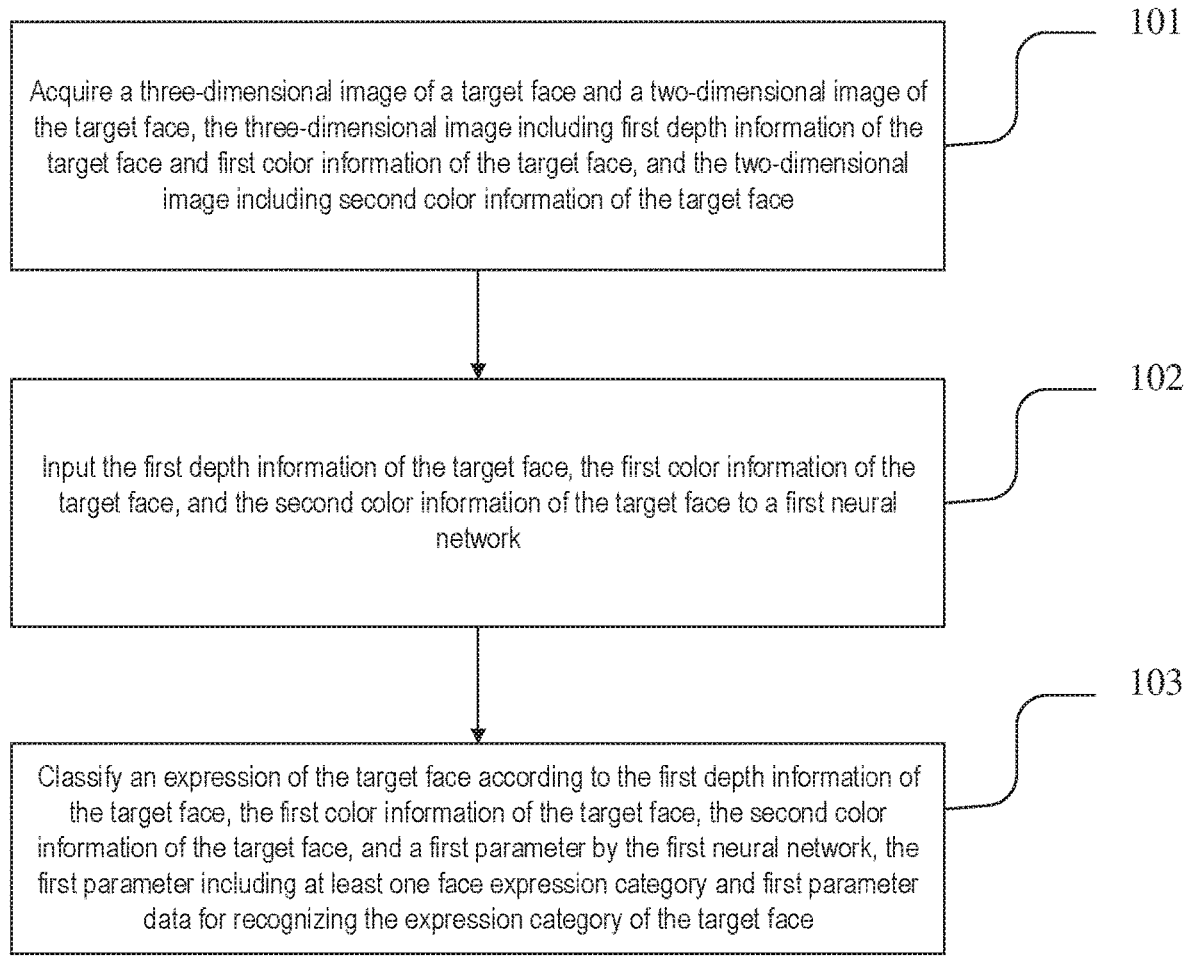
FIG. 1 is a flow diagram of a method for expression recognition provided by embodiment 1 of the present invention.

The technical solutions in the embodiments of the present invention will be described in detail below in combination with the accompanying drawings in the embodiments of the present invention.

The terms "first", "second" and the like in the specification, claims and drawings of the present invention are used for distinguishing different objects, rather than limiting specific sequences.

The term "and/or" in the embodiments of the present invention is merely a correlation for describing correlated objects, and indicates three possible relations, e.g., A and/or B may indicate three situations: A exists separately, A and B exit simultaneously, and B exists separately.

In the embodiments of the present invention, the words such as "exemplary" or "for example" are used for indicating an example or an illustrative example or illustration. Any embodiment or design scheme described as "exemplary" or "for example" in the embodiments of the present invention should not be interpreted as being more preferable or more advantageous than other embodiments or design schemes. Exactly, the words such as "exemplary" or "for example" are used for presenting relevant concepts in specific manners.

It should be noted that, for the sake of compactness and clearness of the drawings, the components shown in the drawings do not need to be drawn to scale. For example, for the sake of clearness, the sizes of some components can be increased relative to other components. In addition, reference signs can be repeated, where appropriate, in the drawings to indicate corresponding or similar components.

It should be noted that, since videos and the like are composed of a plurality of pictures, the processing methods for pictures, imaging, images and the like described in the embodiments of the present invention can be applied to the videos and the like. Those skilled in the art could modify the methods disclosed in the present invention to processing methods applied to videos and the like without any creative effort, and these modified methods fall into the protection scope of the present invention.

Each embodiment of the present invention is elaborated by using a human face as an example, and the technical solutions of the present invention are also applicable to recognition of face expressions of different objects, e.g., different animals, or target objects having characteristics similar to those of a face.

A method for expression recognition provided by embodiment 1 of the present invention will be specifically elaborated below in combination with FIG. 1. As shown in FIG. 1, the method comprises:

Step 101: acquiring a three-dimensional image of a target face and a two-dimensional image of the target face, the three-dimensional image comprising first depth information of the target face and first color information of the target face, and the two-dimensional image comprising second color information of the target face.

Optionally, this acquisition step may be acquiring a three-dimensional image of a target face and a two-dimensional image of the target face, which are photographed by a photographic device, from a memory.

Optionally, the three-dimensional image of the target face and the two-dimensional image of the target face described above may be color images.

Optionally, the foregoing first color information and the second color information may be images of an RGB format or a YUV format, or images of another formats that can be converted to and from the foregoing RGB format or YUV format.

Step 102: inputting the first depth information of the target face, the first color information of the target face and the second color information of the target face to a first neural network. Optionally, input to the first neural network may be a depth image of the target face, an RGB image of the three-dimensional image of the target face and an RGB image of the two-dimensional image of the target face; and input to the first neural network may also be a depth image of the target face, three channels of an RGB image of the three-dimensional image of the target face and three channels of an RGB image of the two-dimensional image of the target face.

Optionally, the foregoing first neural network comprises a first convolutional neural network, and the first convolutional neural network comprises four convolutional layers, four down-sampling layers, one dropout layer and two fully-connected layers.

Step 103: classifying an expression of the target face according to the first depth information of the target face, the first color information of the target face, the second color information of the target face, and a first parameter by the first neural network, the first parameter comprising at least one face expression category and first parameter data for recognizing the expression category of the target face.

Because most expressions are compound expressions and may belong to at least one face expression category, the foregoing first neural network comprises the foregoing first parameter, and the face expression categories included by the first parameter comprise at least one of: fear, sadness, joy, anger, disgust, surprise, nature and contempt. Optionally, in one embodiment, the foregoing first parameter may include face expression categories of eight expression categories of fear, sadness, joy, anger, disgust, surprise, nature and contempt, and first parameter data for recognizing the face expression categories of the foregoing eight expression categories. Specifically, the classification results output by the first neural network may be probabilities that the target face described above belongs to the foregoing different expression categories respectively, and the sum of the probabilities of belonging to the foregoing different expression categories respectively is 1. The first neural network can sequence the output classification results according to magnitudes of the foregoing probabilities. The foregoing first parameter data may comprise the weight of at least one node of the neural network.

Optionally, under the situation that the foregoing first parameter includes one face expression category, the first neural network can be configured to judge whether the expressions of the target face described above belong to the face expression category included by the first parameter.

Optionally, in order to cope with the circumstance that the acquired target face posture is not ideal or the light condition is not ideal, the same first processing can be performed on the three-dimensional image of the target face and the two-dimensional image of the target face to approximately meet the requirement of a standard face or the using requirement, specifically, for example, before the first depth information of the target face, the first color information of the target face and the second color information of the target face are input to the first neural network, the method further comprises: performing the same first processing on the three-dimensional image of the target face and the two-dimensional image of the target face, the first processing comprising at least one of: determining feature points of the three-dimensional image of the target face and the two-dimensional image of the target face, and rotating the three-dimensional image of the target face and the two-dimensional image of the target face based on the feature points; performing mirroring, linear transformation and affine transformation on the three-dimensional image of the target face and the two-dimensional image of the target face; aligning the feature points of the three-dimensional image of the target face and the two-dimensional image of the target face with a set position; performing contrast stretching on the three-dimensional image of the target face and the two-dimensional image of the target face; and performing image pixel value normalization processing on the three-dimensional image of the target face and the two-dimensional image of the target face.

Performing the same first processing on the three-dimensional image of the target face and the two-dimensional image of the target face, as described above, may comprise: performing the first processing on the three-dimensional image of the target face and performing the identical first processing on the two-dimensional image of the target face. Exemplarily, performing the same first processing on the three-dimensional image of the target face and the two-dimensional image of the target face, as described above, may be: performing linear transformation, affine transformation and contrast stretching on the three-dimensional image of the target face, as well as performing the same linear transformation, affine transformation and contrast stretching on the two-dimensional image of the target face; or, an another example, performing mirroring, linear transformation and image pixel value normalization processing on the three-dimensional image of the target face, as well as performing mirroring, linear transformation and image pixel value normalization processing on the two-dimensional image of the target face. Optionally, performing the same first processing on the three-dimensional image of the target face and the two-dimensional image of the target face, as described above, may be: respectively performing the same first processing on depth information (e.g., a depth image) of the target face, three channels of an RGB image of the three-dimensional image of the target face and three channels of an RGB image of the two-dimensional image of the target face; or performing the same first processing on the overall image of the three-dimensional image of the target face and the overall image of the two-dimensional image of the target face, then decomposing the overall images into first depth information of the target face, first color information of the target face and second color information of the target face and inputting them to the first neural network.

Optionally, the foregoing feature points may be eye points, or other face features such as a nose tip point and the like. The foregoing set position aligned with the feature points of the three-dimensional image of the target face and the two-dimensional image of the target face may be one or more feature points of a standard face image, e.g., eye points, or a preset position, or feature points in face express samples that are uniformly aligned when the face expression samples are inputted to the foregoing first neural network during training, e.g., eye points.

Optionally, performing contrast stretching on the three-dimensional image of the target face and the two-dimensional image of the target face, as described above, may comprise performing section-by-section contrast stretching on the three-dimensional image of the target face and the two-dimensional image of the target face according to the characteristics of the three-dimensional image of the target face and/or the two-dimensional image of the target face, or comprise performing section-by-section contrast stretching on pixel values of the three-dimensional image of the target face and the two-dimensional image of the target face according to the magnitudes of the pixel values.

Optionally, performing image pixel value normalization processing on the three-dimensional image of the target face and the two-dimensional image of the target face comprises: normalizing pixel values of channels of the three-dimensional image of the target face and the two-dimensional image of the target face from [0, 255] to [0, 1]. The foregoing channels may comprise depth information of the three-dimensional image of the target face, three channels of an RGB image of the three-dimensional image of the target face and three channels of an RGB image of the two-dimensional image of the target face.

Generally, using a human face as an example, the three-dimensional image of the target face and the two-dimensional image of the target face, which are acquired by the photographic device, comprise redundant parts such as the neck, shoulders and the like in addition to the face, so it needs to be positioned to the face frame position by face detection, then the face is extracted, the above-mentioned face features, e.g., eye points, are positioned, and then the foregoing first processing is performed.

Optionally, the foregoing first parameter data for recognizing the expression categories of the target face is obtained by training three-dimensional images of multiple face expression samples and two-dimensional images of the face expression samples via the first neural network. The three-dimensional images of the face expression samples comprise second depth information of the face expression samples and third color information of the face expression samples, and the two-dimensional images of the face expression samples comprise fourth color information of the face expression samples. Specifically, the second depth information, the third color information and the fourth color information of the foregoing multiple face expression samples can be input to the first neural network and iterated, the multiple face expression samples carry face expression categories representing face expression categories, a parameter combination having high expression accuracy for recognizing the face expression samples is determined as the first parameter for recognizing the expression categories of the target face, and the specific content of the first parameter can be known by referring to the above description. Optionally, the first parameter can be obtained by training the foregoing face expression samples off line, and the product for expression recognition, provided for practical use, may not comprise the foregoing face expression samples.

Because most expressions are compound expressions and may belong to at least one expression category, each of the foregoing face expression samples satisfies (belongs to) at least one of the following face expression categories: fear, sadness, joy, anger, disgust, surprise, nature and contempt. Each of the face expression samples, the second depth information of the face expression sample, the third color information of the face expression sample and the fourth color information of the face expression sample satisfy (belong to) the same face expression category. The third color information and the fourth color information are images of an RGB format or a YUV format. Through the face expression categories carried by the foregoing face expression samples, the face expression categories of components (the second depth information of the face expression samples and the third color information of the face expression samples are components of the three-dimensional images, and the fourth color information of the face expression samples is components of the two-dimensional images) of the foregoing face expression samples input to the first neural network can be determined, and the first neural network can train them to obtain first parameter data corresponding to the foregoing different face expression categories.

Optionally, in order to cope with the circumstance that the acquired face expression sample postures are not ideal or the light condition is not ideal, the same second processing can be performed on the three-dimensional images of the face expression samples and the two-dimensional images of the face expression samples to approximately meet the requirement of a standard face or the using requirement, specifically, for example, before the three-dimensional images of the multiple face expression samples and the two-dimensional images of the face expression samples are trained via the first neural network, the method further comprises: performing the same second processing on the three-dimensional images of the face expression samples and the two-dimensional images of the face expression samples, the second processing comprising at least one of: determining feature points of the three-dimensional images of the face expression samples and the two-dimensional images of the face expression samples, and rotating the three-dimensional images of the face expression samples and the two-dimensional images of the face expression samples based on the feature points; performing mirroring, linear transformation and affine transformation on the three-dimensional images of the face expression samples and the two-dimensional images of the face expression samples; aligning the feature points of the three-dimensional images of the face expression samples and the two-dimensional images of the face expression samples with a set position; performing contrast stretching on the three-dimensional images of the face expression samples and the two-dimensional images of the face expression samples; and performing image pixel value normalization processing on the three-dimensional images of the face expression samples and the two-dimensional images of the face expression samples. The foregoing second processing may be same as or different from the first processing.

Performing the same second processing on the three-dimensional images of the face expression samples and the two-dimensional images of the face expression samples may comprise: performing the second processing on the three-dimensional images of the face expression samples and performing the identical second processing on the two-dimensional images of the face expression samples. Exemplarily, performing the same second processing on the three-dimensional images of the face expression samples and the two-dimensional images of the face expression samples may be: performing linear transformation, affine transformation and contrast stretching on the three-dimensional images of the face expression samples, as well as performing the foregoing linear transformation, affine transformation and contrast stretching on the two-dimensional images of the face expression samples; or, as another example, performing mirroring, linear transformation and image pixel value normalization processing on the three-dimensional images of the face expression samples, as well as performing mirroring, linear transformation and image pixel value normalization processing on the two-dimensional images of the face expression samples. Exemplarily, performing the same second processing on the three-dimensional images of the face expression samples and the two-dimensional images of the face expression samples, as described above, may be: respectively performing the same second processing on second depth information (e.g., depth images) of the face expression samples, three channels of RGB images of the three-dimensional images of the face expression samples and three channels of RGB images of the two-dimensional images of the face expression samples; or performing the same second processing on the overall images of the three-dimensional images of the face expression samples and the overall images of the two-dimensional images of the face expression samples, then decomposing the overall images into second depth information, third color information and fourth color information and inputting them to the first neural network.

Optionally, the foregoing feature points may be eye points, or other face features such as a nose tip point and the like. The foregoing set position aligned with the feature points of the three-dimensional images of the multiple face expression samples and the two-dimensional images of the multiple face expression samples may be one or more feature points of a standard face image, e.g., eye points, or a preset position, or feature points in the face expression samples that are uniformly aligned when the face expression samples are inputted to the foregoing first neural network during training, e.g., eye points.

Optionally, performing contrast stretching on the three-dimensional images of the face expression samples and the two-dimensional images of the face expression samples, as described above, may comprise performing section-by-section contrast stretching on the three-dimensional images of the face expression samples and the two-dimensional images of the face expression samples according to the characteristics of the three-dimensional images of the face expression samples and/or the two-dimensional images of the face expression samples, or comprise performing section-by-section contrast stretching on pixel values of the three-dimensional images of the face expression samples and the two-dimensional images of the face expression samples according to the magnitudes of the pixel values.

Optionally, performing image pixel value normalization processing on the three-dimensional images of the face expression samples and the two-dimensional images of the face expression samples comprises: normalizing pixel values of channels of the three-dimensional images of the face expression samples and the two-dimensional images of the face expression samples from [0, 255] to [0, 1]. The foregoing channels may comprise first depth information of the three-dimensional images of the face expression samples, three channels of RGB images of the three-dimensional images of the face expression samples and three channels of RGB images of the two-dimensional images of the face expression samples.

Generally, using a human face as an example, the three-dimensional images of the face expression samples and the two-dimensional images of the face expression samples, which are acquired by the photographic device, comprise redundant parts such as the neck, shoulders and the like in addition to the face, so it needs to be positioned to the face frame position by face detection, then the face is extracted, the above-mentioned face features, e.g., eye points, are positioned, and then the foregoing second processing is performed.

The method and device for expression recognition, provided by the present invention, can effectively solve the problem that the face expression recognition accuracy declines due to different face postures and different light conditions, and improve the accuracy of face expression recognition of the target face at different face postures and in different light conditions.

Figure 2:
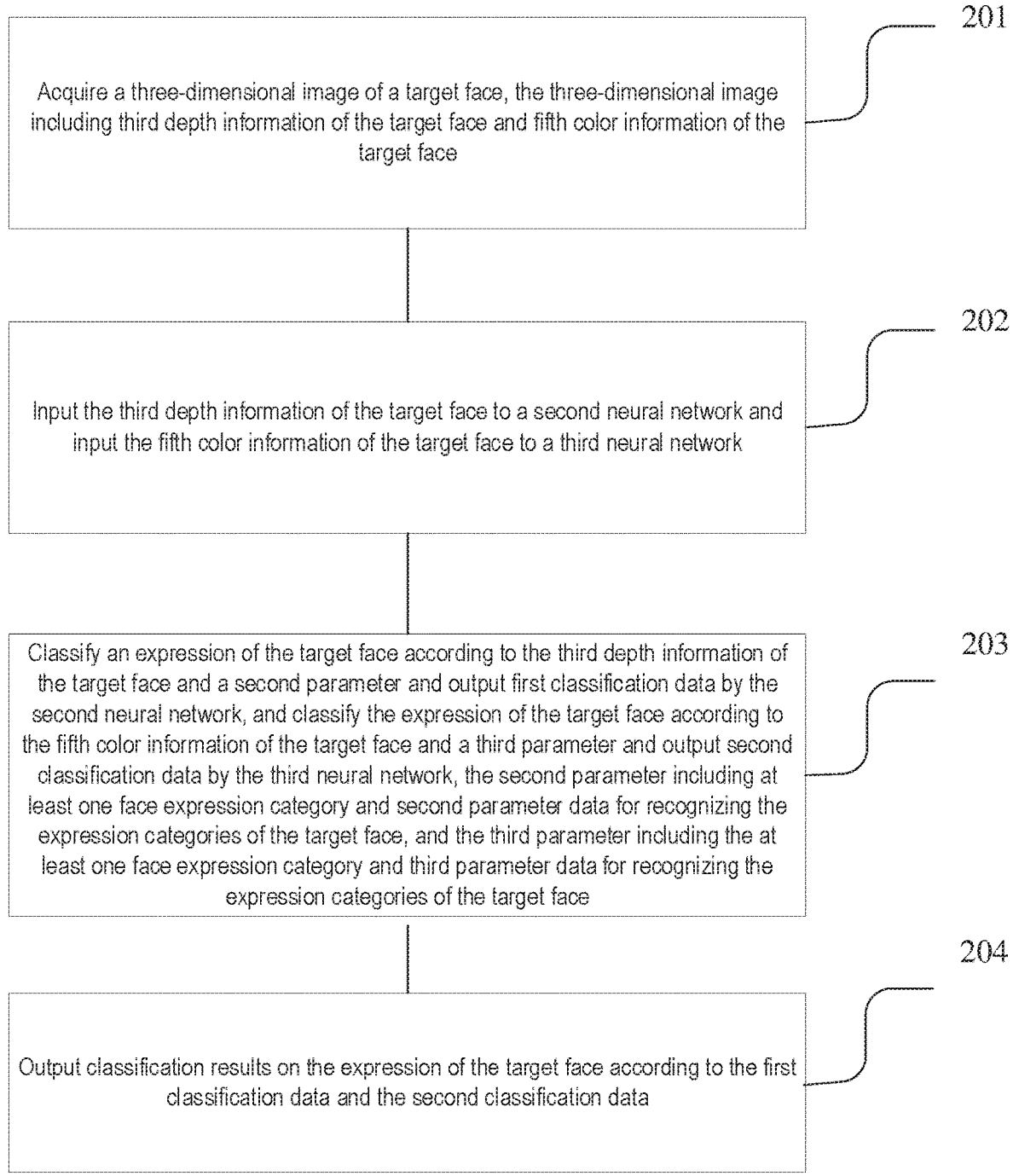
FIG. 2 is a flow diagram of another method for expression recognition provided by embodiment 2 of the present invention.

A method for expression recognition provided by embodiment 2 of the present invention will be specifically elaborated below in combination with FIG. 2. As shown in FIG. 2, the method comprises:

Step 201: acquiring a three-dimensional image of a target face, the three-dimensional image including third depth information of the target face and fifth color information of the target face.

Optionally, this acquisition step may be acquiring a three-dimensional image of a target face, which is photographed by a photographic device, from a memory.

Optionally, the three-dimensional image of the foregoing target face may be a color image.

Optionally, the fifth color information may be an image of an RGB format or a YUV format, or an image of another format that can be converted to and from the foregoing RGB format or YUV format.

Step 202: inputting the third depth information of the target face to a second neural network and inputting the fifth color information of the target face to a third neural network. Optionally, input to the third neural network may be an RGB image of the target face, or three channels of the RGB image of the target face.

Optionally, the second neural network comprises three convolutional layers, three down-sampling layers, one dropout layer and two fully-connected layers. The third neural network comprises four convolutional layers, four down-sampling layers, one dropout layer and two fully-connected layers.

Step 203: classifying an expression of the target face according to the third depth information of the target face and a second parameter and outputting first classification data by the second neural network, and classifying the expression of the target face according to the fifth color information of the target face and a third parameter and outputting second classification data by the third neural network, the second parameter including at least one face expression category and second parameter data for recognizing the expression categories of the target face, and the third parameter including the at least one face expression category and third parameter data for recognizing the expression categories of the target face.

Because most expressions are compound expressions and may belong to at least one face expression category, the foregoing second neural network comprises the foregoing first classification data, and the face expression categories included by the first classification data comprise at least one of: fear, sadness, joy, anger, disgust, surprise, nature and contempt. The foregoing third neural network comprises the foregoing second classification data, and the face expression categories included by the second classification data comprise at least one of: fear, sadness, joy, anger, disgust, surprise, nature and contempt. Optionally, the face expression categories included by the first classification data and the second classification data are same. Exemplarily, both the foregoing first classification data and the foregoing second classification data include eight face expression categories of fear, sadness, joy, anger, disgust, surprise, nature and contempt and eight groups of parameter data corresponding to the foregoing eight face expression categories, and the eight groups of parameter data may include probabilities of belonging to the foregoing eight face expression categories respectively. The foregoing second parameter data and third parameter data include second parameter data for recognizing whether the target face belongs to the foregoing eight face expression categories, e.g., the weight of at least one node of the neural network.

The second neural network comprises a second convolutional neural network, and the third neural network comprises a third convolutional neural network.

Step 204: outputting classification results on the expression of the target face according to the first classification data and the second classification data.

Optionally, outputting classification results on the expressions of the target face according to the first classification data and the second classification data comprises: inputting the first classification data and the second classification data and outputting classification results on the expressions of the target face according to the first classification data, the second classification data and support vector machine parameter data by a support vector machine, the support vector machine comprising the at least one face expression category and the support vector machine parameter data for recognizing the expression category of the target face.

Exemplarily, the first classification data may be a group of eight-dimensional data, i.e., data for indicating eight expression categories. The eight expression categories may be fear, sadness, joy, anger, disgust, surprise, nature and contempt. Optionally, the foregoing data for indicating eight expression categories may be eight probability values that the expressions of the target face respectively belong to the foregoing eight expression categories, and the sum of the eight probability values is 1. Similarly, the second classification data is also of eight expression categories, the input of the support vector machine is two groups of eight-dimensional data, and the support vector machine judges which expression categories the expressions of the target face described above belong to according to the foregoing two groups of eight-dimensional data and the support vector machine parameter data for recognizing the expression category of the target face. The foregoing support vector machine may be a linear support vector machine. The classification results output by the support vector machine may be probabilities that the target face described above belongs to the foregoing different expression categories respectively, and the sum of the probabilities of belonging to the foregoing different expression categories respectively is 1. The support vector machine can sequence the output classification results according to the magnitudes of the probabilities.

Optionally, under the condition that the foregoing first classification data and second classification data includes one face expression category, the support vector machine also includes the one face expression category, and the support vector machine can be configured to judge whether the expressions of the target face described above belong to the face expression category included by the support vector machine.

Optionally, in order to cope with the circumstance that the acquired target face posture is not ideal or the light condition is not ideal, third processing may be performed only on the third depth information of the target face, or third processing is performed on the third depth information of the target face and the same third processing is performed on the fifth color information of the target face. Thus, before inputting the third depth information of the target face to a second neural network and inputting the fifth color information of the target face to a third neural network, the method further comprises:

performing third processing on the third depth information of the target face, the third processing comprising at least one of: determining feature points of the third depth information of the target face, and rotating the third depth information of the target face based on the feature points; performing mirroring, linear transformation and affine transformation on the third depth information of the target face; aligning the feature points of the third depth information of the target face with a set position; performing contrast stretching on the third depth information of the target face; and performing image pixel value normalization processing on the third depth information of the target face;

or, before inputting the third depth information of the target face to a second neural network and inputting the fifth color information of the target face to a third neural network, the method further comprises: performing the same third processing on the third depth information of the target face and the fifth color information of the target face, the third processing comprising at least one of: determining feature points of the third depth information of the target face and feature points of the fifth color information of the target face, and rotating the third depth information of the target face and the fifth color information of the target face based on the feature points; performing mirroring, linear transformation and affine transformation on the third depth information of the target face and the fifth color information of the target face; aligning the feature points of the third depth information of the target face and the fifth color information of the target face with a set position; performing contrast stretching on the third depth information of the target face or the fifth color information of the target face; and performing image pixel value normalization processing on the third depth information of the target face and the fifth color information of the target face.

Performing the same third processing on the third depth information of the target face and the fifth color information of the target face, as described above, may comprise: performing the third processing on the third depth information of the target face and performing the identical third processing on the fifth color information of the target face. Exemplarily, linear transformation, affine transformation and contrast stretching may be performed on the third depth information of the target face, and the same linear transformation, affine transformation and contrast stretching are also performed on the fifth color information of the target face. For another example, mirroring, linear transformation and image pixel value normalization processing are performed on the third depth information of the target face, and the same mirroring, linear transformation and image pixel value normalization processing are also performed on the fifth color information of the target face. Optionally, performing the same third processing on the third depth information of the target face and the fifth color information of the target face, as described above, may be performing the same third processing on the third depth information (e.g., a depth image) of the target face and an RGB image of the three-dimensional image of the target face, or performing the same third processing on the third depth information of the target face and three channels of the RGB image of the three-dimensional image of the target face.

Optionally, the foregoing feature points may be eye points, or other face features such as a nose tip point and the like. The set position aligned with the feature points of the third depth information of the target face and the fifth color information of the target face may be one or more feature points of a standard face image, e.g., eye points, or a preset position, or feature points in face expression samples that are uniformly aligned when the face expression samples are inputted to the foregoing second neural network during training and feature points in face expression samples that are uniformly aligned when the face expression samples are inputted to the foregoing third neural network during training, e.g., eye points. Optionally, the foregoing set position aligned with the feature points of the third depth information of the target face may be one or more feature points of a standard face image, e.g., eye points, or a preset position, or feature points in face expression samples that are uniformly aligned when the face expression samples are inputted to the foregoing second neural network during training.

Optionally, performing contrast stretching on the third depth information of the target face and the fifth color information of the target face, as described above, may comprise performing section-by-section contrast stretching on the third depth information of the target face and the fifth color information of the target face according to the characteristics of the three-dimensional image of the target face, or comprise section-by-section contrast stretching on pixel values of the third depth information of the target face and the fifth color information of the target face according to the magnitudes of the pixel values.

Optionally, performing image pixel value normalization processing on the third depth information of the target face and the fifth color information of the target face comprises: normalizing pixel values of channels of the third depth information of the target face and the fifth color information of the target face from [0, 255] to [0, 1]. The foregoing channels may comprise third depth information of the target face and three channels of an RGB image of the three-dimensional image of the target face. Performing image pixel value normalization processing on the third depth information of the target face comprises: normalizing pixel values of the third depth information of the target face from [0, 255] to [0, 1].

Generally, using a human face as an example, the three-dimensional image of the target face, which is acquired by the photographic device, comprises redundant parts such as the neck, shoulders and the like in addition to the face, so it needs to be positioned to the face frame position by face detection, then the face is extracted, the above-mentioned face features, e.g., eye points, are positioned, and then the foregoing third processing is performed.

Optionally, the second parameter data is obtained by training fourth depth information of multiple face expression samples via the second neural network, and the third parameter data is obtained by training sixth color information of the multiple face expression samples via the third neural network. Three-dimensional images of the face expression samples comprise fourth depth information of the face expression samples and sixth color information of the face expression samples. It may be parallel that the second neural network trains the fourth depth information to obtain the second parameter data and the third neural network trains the sixth color information to obtain the third parameter data. Specifically, the fourth depth information and the sixth color information of the foregoing multiple face expression samples can be input to the foregoing second neural network and third neural network and iterated, the multiple face expression samples carry face expression categories representing face expression categories, a parameter combination having high expression accuracy for recognizing the face expression samples, e.g., the weight of at least one node of the neural network, is determined as the second parameter data and the third parameter data for recognizing the expression categories of the target face, and the specific content of the second parameter data and the third parameter data can be known by referring to the above description. Optionally, the second parameter data and the third parameter data can be obtained by training the foregoing face expression samples off line, and the product for expression recognition, provided for practical use, may not comprise the foregoing face expression samples.

Because most expressions are compound expressions and may belong to at least one expression category, the face expression categories included by the second neural network and the face expression categories included by the third neural network include at least one of: fear, sadness, joy, anger, disgust, surprise, nature and contempt. Each of the face expression samples, the fourth depth information of the face expression sample and the sixth color information of the face expression sample satisfy (belong to) the same face expression category. The foregoing sixth color information is images of an RGB format or a YUV format. Through the face expression categories carried by the foregoing face expression samples, the face expression categories of components (the fourth depth information of the three-dimensional images of the face expression samples and the sixth color information of the three-dimensional images of the face expression samples) of the three-dimensional images of the foregoing face expression samples input to the second neural network and the third neural network can be determined, the second neural network can train them to obtain second parameter data corresponding to the foregoing different face expression categories, and the third neural network can train them to obtain third parameter data corresponding to the foregoing different face expression categories.

Optionally, in order to cope with the circumstance that the acquired face expression sample postures are not ideal or the light condition is not ideal, fourth processing may be performed on the fourth depth information of the face expression samples, or the same fourth processing is performed on the fourth depth information of the face expression samples and the sixth color information of the face expression samples, to approximately meet the requirement of a standard face or the using requirement, specifically, for example, before the fourth depth information of the multiple face expression samples is trained via the second neural network, the method further comprises:

performing fourth processing on the fourth depth information of the face expression samples, the fourth processing comprising at least one of: determining feature points of the fourth depth information of the face expression samples, and rotating the fourth depth information of the face expression samples based on the feature points; performing mirroring, linear transformation and affine transformation on the fourth depth information of the face expression samples; aligning the feature points of the fourth depth information of the face expression samples with a set position; performing contrast stretching on the fourth depth information of the face expression samples; and performing image pixel value normalization processing on the fourth depth information of the face expression samples;

or, before the fourth depth information of the face expression samples is trained via the second neural network and the sixth color information of the face expression samples is trained via the third neural network, the method further comprises: performing the same fourth processing on the fourth depth information of the face expression samples and the sixth color information of the face expression samples, the fourth processing comprising at least one of: determining feature points of the fourth depth information of the face expression samples and feature points of the sixth color information of the face expression samples, and rotating the fourth depth information of the face expression samples and the sixth color information of the face expression samples based on the feature points; performing mirroring, linear transformation and affine transformation on the fourth depth information of the face expression samples and the sixth color information of the face expression samples; aligning the feature points of the fourth depth information of the face expression samples and the sixth color information of the face expression samples with a set position; performing contrast stretching on the fourth depth information of the face expression samples and the sixth color information of the face expression samples; and performing image pixel value normalization processing on the fourth depth information of the face expression samples and the sixth color information of the face expression samples. The foregoing fourth processing may be same as or different from the third processing.

Performing the same fourth processing on the fourth depth information of the face expression samples and the sixth color information of the face expression samples may comprise: performing the fourth processing on the fourth depth information of the face expression samples and performing the identical fourth processing on the sixth color information of the face expression samples. Exemplarily, performing the same fourth processing on the fourth depth information of the face expression samples and the sixth color information of the face expression samples may be:

performing linear transformation, affine transformation and contrast stretching on the fourth depth information of the face expression samples, as well as performing linear transformation, affine transformation and contrast stretching on the sixth color information of the face expression samples; or, as another example, performing mirroring, linear transformation and image pixel value normalization processing on the fourth depth information of the face expression samples, as well as performing mirroring, linear transformation and image pixel value normalization processing on the sixth color information of the face expression samples. Exemplarily, performing the same fourth processing on the fourth depth information of the face expression samples and the sixth color information of the face expression samples, as described above, may be: respectively performing the same fourth processing on the fourth depth information (e.g., depth images) of the face expression samples and three channels of RGB images of the three-dimensional images of the face expression samples; or performing the fourth processing on the overall images of the three-dimensional images of the face expression samples, then decomposing the overall images into the fourth depth information of the face expression samples and the sixth color information of the face expression samples and inputting them to the second neural network and the third neural network.

Optionally, the foregoing feature points may be eye points, or other face features such as a nose tip point and the like. The set position aligned with the feature points of the fourth depth information of the face expression samples and the sixth color information of the face expression samples, or the set position aligned with the feature points of the fourth depth information of the face expression samples, as described above, may be one or more feature points of a standard face image, e.g., eye points, or a preset position, or feature points in the face expression samples that are uniformly aligned when the face expression samples are inputted to the foregoing second neural network and third neural network during training, e.g., eye points.

Optionally, performing contrast stretching on the fourth depth information of the face expression samples, or performing contrast stretching on the fourth depth information of the face expression samples and the sixth color information of the face expression samples, as described above, may comprise: performing section-by-section contrast stretching on the fourth depth information of the face expression samples and the sixth color information of the face expression samples according to the characteristics of the fourth depth information of the face expression samples and/or the sixth color information of the face expression samples, or performing section-by-section contrast stretching on pixel values of the fourth depth information of the face expression samples and the sixth color information of the face expression samples according to the magnitudes of the pixel values.

Optionally, performing image pixel value normalization processing on the fourth depth information of the face expression samples comprises: normalizing pixel values of the fourth depth information of the face expression samples from [0, 255] to [0, 1]; or, performing image pixel value normalization processing on the fourth depth information of the face expression samples and the sixth color information of the face expression samples comprises: normalizing pixel values of channels of the fourth depth information of the face expression samples and the sixth color information of the face expression samples from [0, 255] to [0, 1]. The foregoing channels may comprise fourth depth information of three-dimensional images of the face expression samples, and three channels of RGB images of the sixth color information of the face expression samples.

Generally, using a human face as an example, the three-dimensional images of the face expression samples, which are acquired by the photographic device, comprise redundant parts such as the neck, shoulders and the like in addition to the face, so it needs to be positioned to the face frame position by face detection, then the face is extracted, the above-mentioned face features, e.g., eye points, are positioned, and then the foregoing fourth processing is performed.

The fifth color information is an image of an RGB format or a YUV format. The sixth color information is images of an RGB format or a YUV format.

The support vector machine parameter data for recognizing the expression category of the target face is obtained by training the second neural network with the fourth depth information of the facial expression samples, training the third neural network with the sixth color information of the facial expression samples, combining corresponding output data from the second fully-connected layer of the second neural network and the second fully-connected layer of the third neural network as inputs, and training the support vector machine with the inputs and corresponding expression labels of the facial expression samples. Exemplarily, the output data when the second neural network trains the fourth depth information of the multiple face expression samples may be a group of eight-dimensional data, i.e., data for indicating eight expression categories, and the eight expression categories may be fear, sadness, joy, anger, disgust, surprise, nature and contempt. Similarly, the output data when the third neural network trains the sixth color information of the multiple face expression samples is also of eight expression categories, the input of the support vector machine is two groups of eight-dimensional data described above, and because the two groups of eight-dimensional data described above carry face expression categories representing expression categories, the support vector machine data carrying the face expression categories of the expression categories can be trained via the two groups of eight-dimensional data described above. The two groups of eight-dimensional data described above may be probabilities that the face expression samples respectively belong to different face expression categories.

The method and device for expression recognition, provided by the present invention, can effectively solve the problem that the face expression recognition accuracy declines due to different face postures and different light conditions, and improve the accuracy of face expression recognition of the target face at different face postures and in different light conditions.

Figure 3:
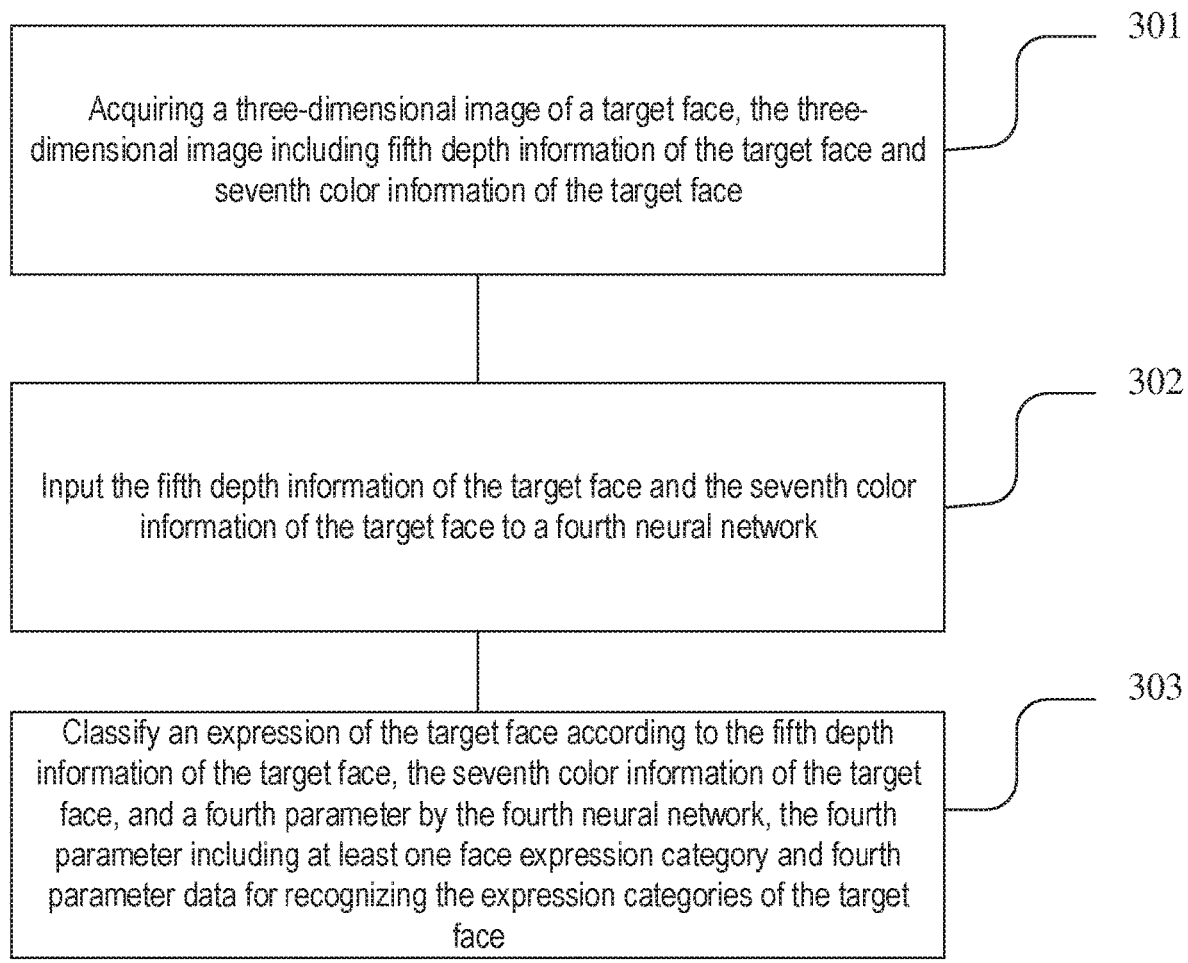
FIG. 3 is a flow diagram of a further method for expression recognition provided by embodiment 3 of the present invention.

A method for expression recognition provided by embodiment 3 of the present invention will be specifically elaborated below in combination with FIG. 3. As shown in FIG. 3, the method comprises:

Step 301: acquiring a three-dimensional image of a target face, the three-dimensional image including fifth depth information of the target face and seventh color information of the target face.

Optionally, this acquisition step may be acquiring a three-dimensional image of a target face, which is photographed by a photographic device, from a memory.

Optionally, the three-dimensional image of the target face described above may be a color image.

Optionally, the seventh color information may be an image of an RGB format or a YUV format, or an image of another format that can be converted to and from the foregoing RGB format or YUV format.

Step 302: inputting the fifth depth information of the target face and the seventh color information of the target face to a fourth neural network. Optionally, input to the fourth neural network may be a depth image of the target face and an RGB image of the three-dimensional image of the target face; input to the fourth neural network may also be a depth image of the target face and three channels of an RGB image of the three-dimensional image of the target face.

Optionally, the fourth neural network comprises a fourth convolutional neural network. The fourth convolutional neural network comprises one segmentation layer, eight convolutional layers, eight down-sampling layers, two dropout layers and five fully-connected layers.

Step 303: classifying an expression of the target face according to the fifth depth information of the target face, the seventh color information of the target face, and a fourth parameter by the fourth neural network, the fourth parameter including at least one face expression category and fourth parameter data for recognizing the expression categories of the target face.

Optionally, because most expressions are compound expressions and may belong to at least one expression category, the fourth neural network may include the fourth parameter, and the face expression categories included by the fourth parameter include at least one of: fear, sadness, joy, anger, disgust, surprise, nature and contempt. Exemplarily, the foregoing fourth parameter may include the face expression categories of eight expression categories of fear, sadness, joy, anger, disgust, surprise, nature and contempt, and fourth parameter data for recognizing the foregoing eight face expression categories, e.g., the weight of at least one node of the fourth neural network. Specifically, the classification results output by the fourth neural network may be probabilities that the target face described above belongs to the foregoing different expression categories respectively, and the sum of the probabilities of belonging to the foregoing different expression categories respectively is 1. The fourth neural network can sequence the output classification results according to the magnitudes of the foregoing probabilities.

Optionally, under the condition that the foregoing fourth parameter includes one face expression category, the fourth neural network can be configured to judge whether the expressions of the target face described above belong to the face expression category included by the fourth parameter.

Optionally, in order to cope with the circumstance that the acquired target face posture is not ideal or the light condition is not ideal, fifth processing may be performed on the three-dimensional image of the target face to approximately meet the requirement of a standard face or the using requirement, specifically, for example, before inputting the fifth depth information of the target face and the seventh color information of the target face to a fourth neural network, the method further comprises: performing fifth processing on the three-dimensional image of the target face, the fifth processing comprising at least one of: determining feature points of the three-dimensional image of the target face, and rotating the three-dimensional image of the target face based on the feature points; performing mirroring, linear transformation and affine transformation on the three-dimensional image of the target face; aligning the feature points of the three-dimensional image of the target face with a set position; performing contrast stretching on the three-dimensional image of the target face; and performing image pixel value normalization processing on the three-dimensional image of the target face.

Performing the fifth processing on the three-dimensional image of the target face, as described above, may be performing the same fifth processing on the fifth depth information of the target face and the seventh color information of the target face, i.e., performing the fifth processing on the fifth depth information of the target face and performing the identical fifth processing on the seventh color information of the target face. Exemplarily, performing the same fifth processing on the fifth depth information of the target face and the seventh color information of the target face may be: performing linear transformation, affine transformation and contrast stretching on the fifth depth information of the target face, as well as performing linear transformation, affine transformation and contrast stretching on the seventh color information of the target face; or, as another example, performing mirroring, linear transformation and image pixel value normalization processing on the fifth depth information of the target face, as well as performing mirroring, linear transformation and image pixel value normalization processing on the seventh color information of the target face. Optionally, performing the fifth processing on the three-dimensional image of the target face, as described above, may be: respectively performing the same fifth processing on the fifth depth information (e.g., a depth image) of the target face and three channels of an RGB image of the seventh color information of the target face; or performing the fifth processing on the overall image of the three-dimensional image of the target face, then decomposing the overall image into the fifth depth information and the seventh color information and inputting them to the fourth neural network.

Optionally, the foregoing feature points may be eye points, or other face features such as a nose tip point and the like. The set position aligned with the feature points of the three-dimensional image of the target face may be one or more feature points of a standard face image, e.g., eye points, or a preset position, or feature points in face expression samples that are uniformly aligned when the face expression samples are inputted to the foregoing fourth neural network during training, e.g., eye points.

Performing contrast stretching on the three-dimensional image of the target face, as described above, may comprise performing section-by-section contrast stretching on the three-dimensional image of the target face according to the characteristics of the three-dimensional image of the target face, or comprise performing section-by-section contrast stretching on pixel values of the three-dimensional image of the target face according to the magnitudes of the pixel values.

Optionally, performing image pixel value normalization processing on the three-dimensional image of the target face comprises: normalizing pixel values of channels of the three-dimensional image of the target face from [0, 255] to [0, 1]. The foregoing channels may comprise depth information of the three-dimensional image of the target face and three channels of an RGB image of the three-dimensional image of the target face.

Generally, using a human face as an example, the three-dimensional image of the target face, which is acquired by the photographic device, comprises redundant parts such as the neck, shoulders and the like in addition to the face, so it needs to be positioned to the face frame position by face detection, then the face is extracted, the above-mentioned face features, e.g., eye points, are positioned, and then the foregoing fifth processing is performed.

Optionally, the fourth parameter data is obtained by training three-dimensional images of multiple face expression samples via the fourth neural network. The three-dimensional images of the face expression samples comprise sixth depth information of the face expression samples and eighth color information of the face expression samples. Specifically, the sixth depth information and the eighth color information of the foregoing multiple face expression samples can be input to the fourth neural network and iterated, the multiple face expression samples carry face expression categories representing face expression categories, a parameter combination having high expression accuracy for recognizing the face expression samples, e.g., the weight of at least one node of the neural network, is determined as the fourth parameter for recognizing the expression categories of the target face, and the specific content of the fourth parameter can be known by referring to the above description. Optionally, the fourth parameter can be obtained by training the foregoing face expression samples off line, and the product for expression recognition, provided for practical use, may not comprise the foregoing face expression samples.

Because most expressions are compound expressions and may belong to at least one expression category, each of the face expression samples satisfies (belongs to) at least one of the following face expression categories: fear, sadness, joy, anger, disgust, surprise, nature and contempt. Each of the face expression samples, the sixth depth information of the face expression sample and the eighth color information of the face expression sample satisfy (belong to) the same face expression category. The eighth color information is images of an RGB format or a YUV format. Through the face expression categories carried by the foregoing face expression samples, the face expression categories of components (the sixth depth information of the face expression samples and the eighth color information of the face expression samples are components of the three-dimensional image) of the foregoing face expression samples input to the fourth neural network can be determined, and the fourth neural network can train them to obtain the fourth parameter corresponding to the foregoing different face expression categories.

Optionally, in order to cope with the circumstance that the acquired face expression sample postures are not ideal or the light condition is not ideal, six processing can be performed on the three-dimensional images of the face expression samples to approximately meet the requirement of a standard face or the using requirement, specifically, for example, before the three-dimensional images of the multiple face expression samples are trained via the fourth neural network, sixth processing is performed on the three-dimensional images of the face expression samples, and the sixth processing comprises at least one of: determining feature points of the three-dimensional images of the face expression samples, and rotating the three-dimensional images of the face expression samples based on the feature points; performing mirroring, linear transformation and affine transformation on the three-dimensional images of the face expression samples; aligning the feature points of the three-dimensional images of the face expression samples with a set position; performing contrast stretching on the three-dimensional images of the face expression samples; and performing image pixel value normalization processing on the three-dimensional images of the face expression samples. The foregoing sixth processing may be same as or different from the fifth processing.

Optionally, performing the sixth processing on the three-dimensional images of the face expression samples may comprise: performing the same sixth processing on the sixth depth information and the eighth color information of the face expression samples, i.e., performing the sixth processing on the sixth depth information of the face expression samples, and performing the identical sixth processing on the eighth color information of the face expression samples. Exemplarily, linear transformation, affine transformation and contrast stretching may be performed on the sixth depth information of the face expression samples, and the foregoing linear transformation, affine transformation and contrast stretching are also performed on the eighth color information of the face expression samples; or, as another example, mirroring, linear transformation and image pixel value normalization processing are performed on the sixth depth information of the face expression samples, and mirroring, linear transformation and image pixel value normalization processing are also performed on the eighth color information of the face expression samples. Exemplarily, performing the same sixth processing on the sixth depth information of the face expression samples and the eighth color information of the face expression samples, as described above, may be: respectively performing the same sixth processing on the sixth depth information (e.g., depth images) of the face expression samples, and three channels of the eighth color information, e.g., RGB images, of the three-dimensional images of the face expression samples; or performing the same sixth processing on the overall images of the three-dimensional images of the face expression samples, then decomposing the overall images into the sixth depth information and the eighth color information and inputting them to the fourth neural network.

Optionally, the foregoing feature points may be eye points, or other face features such as a nose tip point and the like. The foregoing set position aligned with the feature points of the three-dimensional images of the multiple face expression samples may be one or more feature points of a standard face image, e.g., eye points, or a preset position, or feature points in the face expression samples that are uniformly aligned when the face expression samples are inputted to the foregoing fourth neural network during training, e.g., eye points.

Optionally, performing contrast stretching on the three-dimensional images of the face expression samples, as described above, may comprise performing section-by-section contrast stretching on the three-dimensional images of the face expression samples according to the characteristics of the three-dimensional images of the face expression samples, or comprise performing section-by-section contrast stretching on pixel values of the three-dimensional images of the face expression samples according to the magnitudes of the pixel values.

Optionally, performing image pixel value normalization processing on the three-dimensional images of the face expression samples comprises: normalizing pixel values of channels of the three-dimensional images of the face expression samples from [0, 255] to [0, 1]. The foregoing channels may comprise the sixth depth information of the three-dimensional images of the face expression samples, and three channels of the eight color information, e.g., RGB images, of the three-dimensional images of the face expression samples.

Generally, using a human face as an example, the three-dimensional images of the face expression samples, which are acquired by the photographic device, comprise redundant parts such as the neck, shoulders and the like in addition to the face, so it needs to be positioned to the face frame position by face detection, then the face is extracted, the above-mentioned face features, e.g., eye points, are positioned, and then the foregoing sixth processing is performed.

The method and device for expression recognition, provided by the present invention, can effectively solve the problem that the face expression recognition accuracy declines due to different face postures and different light conditions, and improve the accuracy of face expression recognition of the target face at different face postures and in different light conditions.

Figure 4:
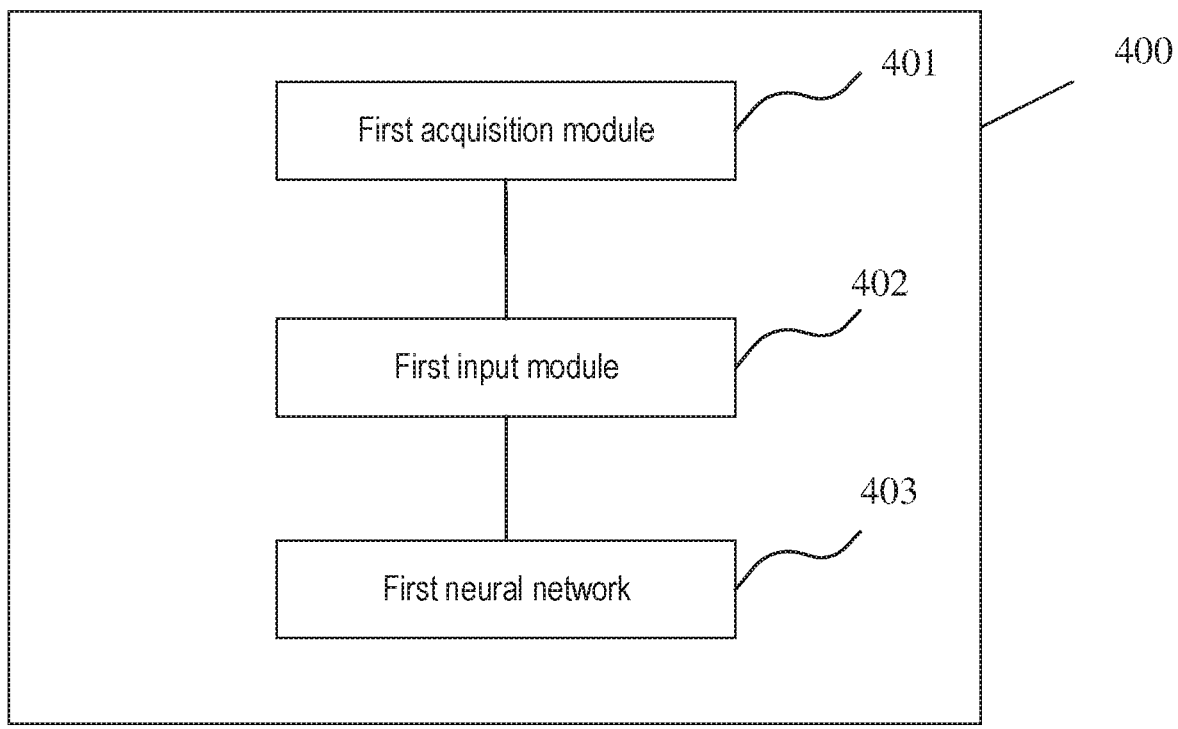
FIG. 4 is a structural schematic diagram of a device for expression recognition provided by embodiment 4 of the present invention.

A device for expression recognition provided by embodiment 4 of the present invention will be specifically elaborated below in combination with FIG. 4. The device 400 may comprise the following modules:

A first acquisition module 401 is configured to acquire a three-dimensional image of a target face and a two-dimensional image of the target face, the three-dimensional image comprising first depth information of the target face and first color information of the target face, and the two-dimensional image comprising second color information of the target face.

Optionally, the acquisition module 401 may acquire a three-dimensional image of a target face and a two-dimensional image of the target face, which are photographed by a photographic device, from a memory.

Optionally, the foregoing first color information and the second color information may be images of an RGB format or a YUV format, or images of other formats that can be converted to and from the foregoing RGB format or YUV format.

A first input module 402 is configured to input the first depth information of the target face, the first color information of the target face and the second color information of the target face to a first neural network. Optionally, input to the first neural network may be a depth image of the target face, an RGB image of the three-dimensional image of the target face and an RGB image of the two-dimensional image of the target face; and input to the first neural network may also be a depth image of the target face, three channels of an RGB image of the three-dimensional image of the target face and three channels of an RGB image of the two-dimensional image of the target face.

Optionally, the foregoing first neural network comprises a first convolutional neural network, and the first convolutional neural network comprises four convolutional layers, four down-sampling layers, one dropout layer and two fully-connected layers.

The first neural network 403 is configured to classify expressions of the target face according to the first depth information of the target face, the first color information of the target face, the second color information of the target face and a first parameter, the first parameter comprising at least one face expression category and first parameter data for recognizing the expression categories of the target face. Because most expressions are compound expressions and may belong to at least one face expression category, the foregoing first neural network comprises the foregoing first parameter, and the face expression categories included by the first parameter comprise at least one of: fear, sadness, joy, anger, disgust, surprise, nature and contempt. Optionally, in one embodiment, the foregoing first parameter may include face expression categories of eight expression categories of fear, sadness, joy, anger, disgust, surprise, nature and contempt, and first parameter data for recognizing the foregoing eight face expression categories, e.g., the weight of at least one node of the first neural network. Specifically, the classification results output by the first neural network 403 may be probabilities that the target face described above belongs to the foregoing different expression categories respectively, and the sum of the probabilities of belonging to the foregoing different expression categories respectively is 1. The first neural network 403 can sequence the output classification results according to the magnitudes of the foregoing probabilities. Optionally, under the situation that the foregoing first parameter includes one face expression category, the first neural network can be configured to judge whether the expressions of the target face described above belong to the face expression category included by the first parameter.

Optionally, in order to cope with the circumstance that the acquired target face posture is not ideal or the light condition is not ideal, the same first processing can be performed on the three-dimensional image of the target face and the two-dimensional image of the target face to approximately meet the requirement of a standard face or the using requirement, specifically, the device further comprises a first processing module, and the first processing module is configured to perform the same first processing on the three-dimensional image of the target face and the two-dimensional image of the target face, and input the three-dimensional image of the target face and the two-dimensional image of the target face subjected to the first processing to the first input module. The first processing module comprises at least one of the following sub-modules: a first rotating sub-module, a first transformation sub-module, a first alignment sub-module, a first contrast stretching sub-module and a first normalization processing sub-module. The first rotating sub-module is configured to determine feature points of the three-dimensional image of the target face and the two-dimensional image of the target face, and rotate the three-dimensional image of the target face and the two-dimensional image of the target face based on the feature points. The first transformation sub-module is configured to perform mirroring, linear transformation and affine transformation on the three-dimensional image of the target face and the two-dimensional image of the target face. The first alignment sub-module is configured to align the feature points of the three-dimensional image of the target face and the two-dimensional image of the target face with a set position. The first contrast stretching sub-module is configured to perform contrast stretching on the three-dimensional image of the target face and the two-dimensional image of the target face. The first normalization processing sub-module is configured to perform image pixel value normalization processing on the three-dimensional image of the target face and the two-dimensional image of the target face.

Performing the same first processing on the three-dimensional image of the target face and the two-dimensional image of the target face, as described above, may comprise: performing the first processing on the three-dimensional image of the target face and performing the identical first processing on the two-dimensional image of the target face. Exemplarily, performing the same first processing of the first processing module on the three-dimensional image of the target face and the two-dimensional image of the target face, as described above, may be: performing linear transformation and affine transformation of the first transformation sub-module on the three-dimensional image of the target face and contrast stretching of the first contrast stretching sub-module on the three-dimensional image of the target face, as well as performing the same linear transformation and affine transformation of the first transformation sub-module on the two-dimensional image of the target face and contrast stretching of the first contrast stretching sub-module on the two-dimensional image of the target face; or, as another example, performing mirroring and linear transformation by the first transformation sub-module and performing image pixel value normalization processing by the first normalization processing sub-module on the three-dimensional image of the target face, as well as performing mirroring and linear transformation by the first transformation sub-module and performing image pixel value normalization processing by the first normalization processing sub-module on the two-dimensional image of the target face. Optionally, the first processing module specifically can be configured to: respectively perform the same first processing on depth information (e.g., a depth image) of the target face, three channels of an RGB image of the three-dimensional image of the target face and three channels of an RGB image of the two-dimensional image of the target face; or perform the same first processing on the overall image of the three-dimensional image of the target face and the overall image of the two-dimensional image of the target face, then decompose the overall images into first depth information of the target face, first color information of the target face and second color information of the target face and input them to the first neural network.

Optionally, the foregoing feature points may be eye points, or other face features such as a nose tip point and the like. The foregoing set position aligned with the feature points of the three-dimensional image of the target face and the two-dimensional image of the target face may be one or more feature points of a standard face image, e.g., eye points, or a preset position, or feature points in face expression samples that are uniformly aligned when the face expression samples are inputted to the foregoing first neural network during training, e.g., eye points.

Optionally, the foregoing first contrast stretching sub-module specifically can be configured to perform section-by-section contrast stretching on the three-dimensional image of the target face and the two-dimensional image of the target face according to the characteristics of the three-dimensional image of the target face and/or the two-dimensional image of the target face, or perform section-by-section contrast stretching on pixel values of the three-dimensional image of the target face and the two-dimensional image of the target face according to the magnitudes of the pixel values.

Optionally, the first normalization processing sub-module specifically can be configured to normalize pixel values of channels of the three-dimensional image of the target face and the two-dimensional image of the target face from [0, 255] to [0, 1]. The foregoing channels may comprise depth information of the three-dimensional image of the target face, three channels of an RGB image of the three-dimensional image of the target face and three channels of an RGB image of the two-dimensional image of the target face.

Generally, using a human face as an example, the three-dimensional image of the target face and the two-dimensional image of the target face, which are acquired by the photographic device, comprise redundant parts such as the neck, shoulders and the like in addition to the face, so it needs to be positioned to the face frame position by face detection, then the face is extracted, the above-mentioned face features, e.g., eye points, are positioned, and then the foregoing first processing is performed.

Optionally, the foregoing first parameter data for recognizing the expression categories of the target face is obtained by training three-dimensional images of multiple face expression samples and two-dimensional images of the face expression samples via the first neural network. The three-dimensional images of the face expression samples comprise second depth information of the face expression samples and third color information of the face expression samples, and the two-dimensional images of the face expression samples comprise fourth color information of the face expression samples. Specifically, the first input module 402 can input the second depth information, the third color information and the fourth color information of the multiple face expression samples to the first neural network 403 and iterate them, the multiple face expression samples carry face expression categories representing face expression categories, the first neural network 403 determines a parameter combination having high expression accuracy for recognizing the face expression samples, e.g., the weight of at least one node thereof, as the first parameter for recognizing the expression categories of the target face, and the specific content of the first parameter can be known by referring to the above description. Optionally, the first parameter can be obtained by training the foregoing face expression samples off line, and the product for expression recognition, provided for practical use, may not comprise the foregoing face expression samples.

Because most expressions are compound expressions and may belong to at least one expression category, each of the foregoing face expression samples satisfies (belongs to) at least one of the following face expression categories: fear, sadness, joy, anger, disgust, surprise, nature and contempt. Each of the face expression samples, the second depth information of the face expression sample, the third color information of the face expression sample and the fourth color information of the face expression sample satisfy (belong to) the same face expression category. The third color information and the fourth color information are images of an RGB format or a YUV format. Through the face expression categories carried by the foregoing face expression samples, the first neural network 403 can determine the face expression categories of components (the second depth information of the face expression samples and the third color information of the face expression samples are components of the three-dimensional images, and the fourth color information of the face expression samples is components of the two-dimensional images) of the foregoing face expression samples input to the first neural network, and the first neural network 403 can train them to obtain first parameter data corresponding to the foregoing different face expression categories.

Optionally, in order to cope with the circumstance that the acquired face expression sample postures are not ideal or the light condition is not ideal, the same second processing can be performed on the three-dimensional images of the face expression samples and the two-dimensional images of the face expression samples to approximately meet the requirement of a standard face or the using requirement, specifically, the device further comprises a second processing module, and the second processing module is configured to perform the same second processing on the three-dimensional images of the face expression samples and the two-dimensional images of the face expression samples, and input the three-dimensional images of the face expression samples and the two-dimensional images of the face expression samples subjected to the second processing to the first input module. The second processing module comprises a second rotating sub-module, a second transformation sub-module, a second alignment sub-module, a second contrast stretching sub-module and a second normalization processing sub-module. The second rotating sub-module is configured to determine feature points of the three-dimensional images of the face expression samples and the two-dimensional images of the face expression samples, and rotate the three-dimensional images of the face expression samples and the two-dimensional images of the face expression samples based on the feature points. The second transformation sub-module is configured to perform mirroring, linear transformation and affine transformation on the three-dimensional images of the face expression samples and the two-dimensional images of the face expression samples. The second alignment sub-module is configured to align the feature points of the three-dimensional images of the face expression samples and the two-dimensional images of the face expression samples with a set position. The second contrast stretching sub-module is configured to perform contrast stretching on the three-dimensional images of the face expression samples and the two-dimensional images of the face expression samples. The second normalization processing sub-module is configured to perform image pixel value normalization processing on the three-dimensional images of the face expression samples and the two-dimensional images of the face expression samples. The foregoing second processing module may be same as or different from the first processing module.

The second processing module specifically can be configured to perform the second processing on the three-dimensional images of the face expression samples and perform the identical second processing on the two-dimensional images of the face expression samples. Exemplarily, the second processing module specifically can be configured to: perform linear transformation and affine transformation on the three-dimensional images of the face expression samples via the second transformation sub-module and perform contrast stretching on the three-dimensional images of the face expression samples via the second contrast stretching sub-module, as well as perform the foregoing linear transformation and affine transformation on the two-dimensional images of the face expression samples via the second transformation sub-module and perform contrast stretching on the two-dimensional images of the face expression samples via the second contrast stretching sub-module; or, as another example, perform mirroring and linear transformation on the three-dimensional images of the face expression samples via the second transformation sub-module and perform image pixel value normalization processing on the three-dimensional images of the face expression samples via the second normalization processing sub-module, as well as perform mirroring and linear transformation on the two-dimensional images of the face expression samples via the second transformation sub-module and perform image pixel value normalization processing on the two-dimensional images of the face expression samples via the second normalization processing sub-module. Exemplarily, the foregoing second processing module specifically can be configured to respectively perform the same second processing on second depth information (e.g., depth images) of the face expression samples, three channels of RGB images of the three-dimensional images of the face expression samples and three channels of RGB images of the two-dimensional images of the face expression samples; or perform the same second processing on the overall images of the three-dimensional images of the face expression samples and the overall images of the two-dimensional images of the face expression samples, then decompose of the overall images into second depth information, third color information and fourth color information and input them to the first neural network.

Optionally, the foregoing feature points may be eye points, or other face features such as a nose tip point and the like. The foregoing set position aligned with the feature points of the three-dimensional images of the face expression samples and the two-dimensional images of the face expression samples may be one or more feature points of a standard face image, e.g., eye points, or a preset position, or feature points in the face expression samples that are uniformly aligned when the face expression samples are inputted to the foregoing first neural network during training, e.g., eye points.

Optionally, the foregoing second contrast stretching sub-module specifically can be configured to perform section-by-section contrast stretching on the three-dimensional images of the face expression samples and the two-dimensional images of the face expression samples according to the characteristics of the three-dimensional images of the face expression samples and/or the two-dimensional images of the face expression samples, or perform section-by-section contrast stretching on pixel values of the three-dimensional images of the face expression samples and the two-dimensional images of the face expression samples according to the magnitudes of the pixel values.

Optionally, the second normalization processing sub-module specifically can be configured to normalize pixel values of channels of the three-dimensional images of the face expression samples and the two-dimensional images of the face expression samples from [0, 255] to [0, 1]. The foregoing channels may comprise first depth information of the three-dimensional images of the face expression samples, three channels of RGB images of the three-dimensional images of the face expression samples and three channels of RGB images of the two-dimensional images of the face expression samples.

Generally, using a human face as an example, the three-dimensional images of the face expression samples and the two-dimensional images of the face expression samples, which are acquired by the photographic device, comprise redundant parts such as the neck, shoulders and the like in addition to the face, so it needs to be positioned to the face frame position by face detection, then the face is extracted, the above-mentioned face features, e.g., eye points, are positioned, and then the foregoing second processing is performed.

The method and device for expression recognition, provided by the present invention, can effectively solve the problem that the face expression recognition accuracy declines due to different face postures and different light conditions, and improve the accuracy of face expression recognition of the target face at different face postures and in different light conditions.

Figure 5:
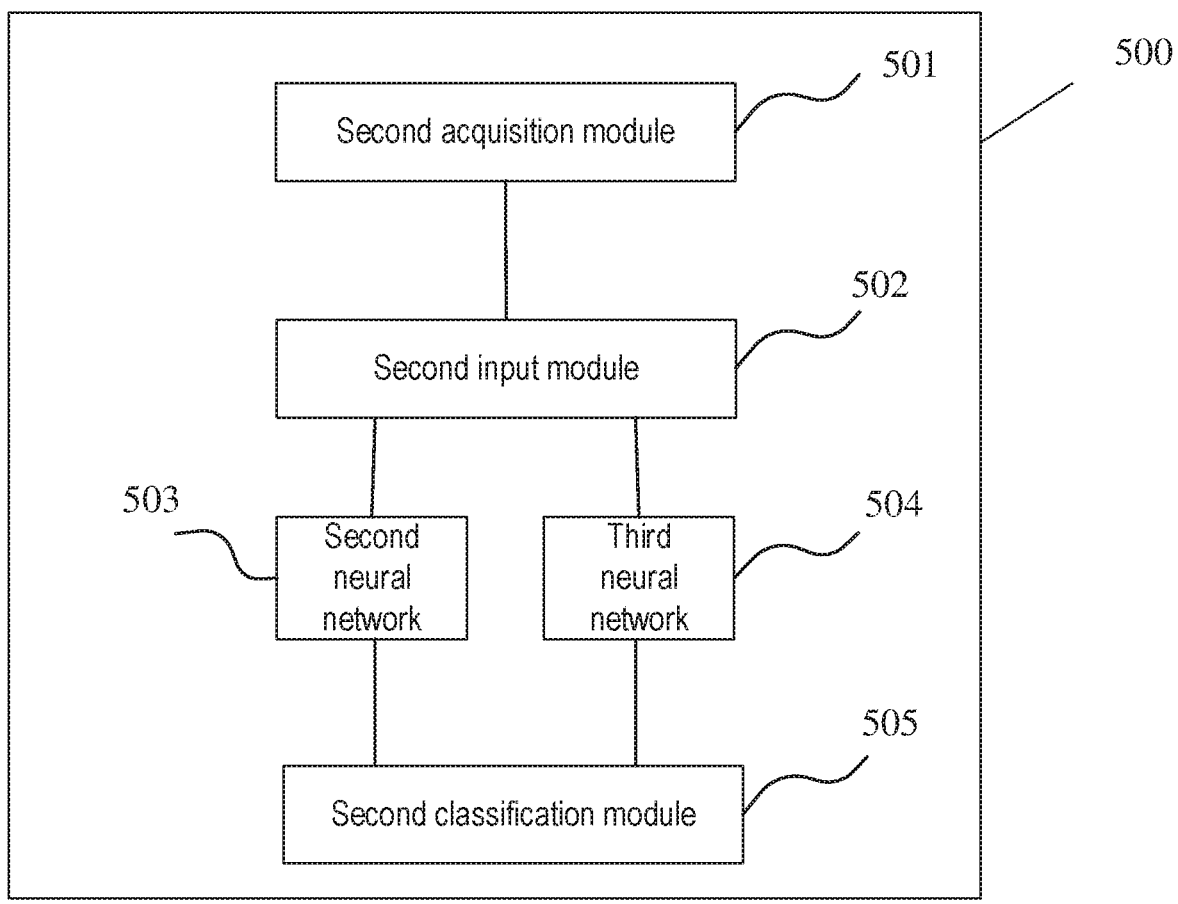
FIG. 5 is a structural schematic diagram of another device for expression recognition provided by embodiment 5 of the present invention.

A device for expression recognition provided by embodiment 5 of the present invention will be specifically elaborated below in combination with FIG. 5. As shown in FIG. 5, the device 500 comprises a second acquisition module 501, a second input module 502, a second neural network 503, a third neural network 504 and a second classification module 505.

The second acquisition module 501 is configured to acquire a three-dimensional image of a target face, the three-dimensional image comprising third depth information of the target face and fifth color information of the target face. Optionally, the three-dimensional image of the target face described above may be a color image. Optionally, the foregoing fifth color information may be an image of an RGB format or a YUV format, or an image of other format that can be converted to and from the foregoing RGB format or YUV format. Optionally, the second acquisition module 501 may acquire a three-dimensional image of a target face, which is photographed by a photographic device, from a memory.

The second input module 502 is configured to input the third depth information of the target face to the second neural network 503 and input the fifth color information of the target face to the third neural network 504.

Optionally, the second neural network 503 comprises three convolutional layers, three down-sampling layers, one dropout layer and two fully-connected layers. The third neural network 504 comprises four convolutional layers, four down-sampling layers, one dropout layer and two fully-connected layers.

The second neural network 503 is configured to classify expressions of the target face according to the third depth information of the target face and a second parameter and output first classification data, and the third neural network 504 is configured to classify expressions of the target face according to the fifth color information of the target face and a third parameter and output second classification data, the second parameter comprising at least one face expression category and second parameter data for recognizing the expression categories of the target face, and the third parameter comprising the at least one face expression category and third parameter data for recognizing the expression categories of the target face.

Because most expressions are compound expressions and may belong to at least one face expression category, the foregoing second neural network comprises the foregoing first classification data, and the face expression categories included by the first classification data comprise at least one of: fear, sadness, joy, anger, disgust, surprise, nature and contempt. The foregoing third neural network comprises the foregoing second classification data, and the face expression categories included by the second classification data comprise at least one of: fear, sadness, joy, anger, disgust, surprise, nature and contempt. Optionally, the face expression categories included by the first classification data and the second classification data are same. Both the foregoing first classification data and the foregoing second classification data include eight face expression categories of fear, sadness, joy, anger, disgust, surprise, nature and contempt, and eight groups of parameter data corresponding to the face expression categories of the foregoing eight expression categories, e.g., probabilities that the expressions of the target face described above belong to the foregoing eight face expression categories respectively. The foregoing second parameter data and the third parameter data are used for recognizing which of the foregoing eight face expression categories the expressions of the target face belong to, e.g., the weight of at least one node of the foregoing second neural network, and the weight of at least one node of the third neural network.

The second neural network comprises a second convolutional neural network, and the third neural network comprises a third convolutional neural network.

The second classification module 505 is configured to output classification results on the expressions of the target face according to the first classification data and the second classification data.

Optionally, the second classification module 505 comprises a support vector machine, the support vector machine can be configured to: input the first classification data and the second classification data and output classification results on the expressions of the target face according to the first classification data, the second classification data and support vector machine parameter data, and the support vector machine comprises the at least one face expression category and the support vector machine parameter data for recognizing the expression category of the target face.

Exemplarily, the first classification data may be a group of eight-dimensional data, i.e., data for indicating eight expression categories, and the eight expression categories may be fear, sadness, joy, anger, disgust, surprise, nature and contempt. Optionally, the foregoing data for indicating eight expression categories may be eight probability values that the expressions of the target face respectively belong to the foregoing eight expression categories, and the sum of the eight probability values is 1. Similarly, the second classification data is also of eight expression categories, the input of the support vector machine is two groups of eight-dimensional data, and the support vector machine judges which expression categories the expressions of the target face described above belong to according to the foregoing two groups of eight-dimensional data and the support vector machine parameter data for recognizing the expression category of the target face. The foregoing support vector machine may be a linear support vector machine. The classification results output by the support vector machine may be probabilities that the target face described above belongs to the foregoing different expression categories respectively, and the sum of the probabilities of belonging to the foregoing different expression categories respectively is 1. The support vector machine can sequence the output classification results according to the magnitudes of the foregoing probabilities.

Optionally, under the condition that the foregoing first classification data and second classification data includes one face expression category, the support vector machine also includes the one face expression category, and the support vector machine can be configured to judge whether the expressions of the target face described above belong to the face expression category included by the support vector machine.

Optionally, in order to cope with the circumstance that the acquired target face posture is not ideal or the light condition is not ideal, the device further comprises a third processing module, and the third processing module is configured to perform third processing on the third depth information of the target face, and input the third depth information of the target face subjected to the third processing to the second input module. The third processing module comprises at least one of a third rotating sub-module, a third transformation sub-module, a third alignment sub-module, a third contrast stretching sub-module and a third normalization processing sub-module. The third rotating sub-module is configured to determine feature points of the third depth information of the target face, and rotate the third depth information of the target face based on the feature points. The third transformation sub-module is configured to perform mirroring, linear transformation and affine transformation on the third depth information of the target face. The third alignment sub-module is configured to align the feature points of the third depth information of the target face with a set position. The third contrast stretching sub-module is configured to perform contrast stretching on the third depth information of the target face. The third normalization processing sub-module is configured to perform image pixel value normalization processing on the third depth information of the target face.

The third processing module is further configured to perform the same third processing on the third depth information of the target face and the fifth color information of the target face, and input the third depth information of the target face and the fifth color information of the target face subjected to the third processing to the second input module. The third rotating sub-module is further configured to determine feature points of the third depth information of the target face and feature points of the fifth color information of the target face, and rotate the third depth information of the target face and the fifth color information of the target face based on the feature points. The third transformation sub-module is further configured to perform mirroring, linear transformation and affine transformation on the third depth information of the target face and the fifth color information of the target face. The third alignment sub-module is further configured to align the feature points of the third depth information of the target face and the fifth color information of the target face with a set position. The third contrast stretching sub-module is further configured to perform contrast stretching on the third depth information of the target face or the fifth color information of the target face. The third normalization processing sub-module is further configured to perform image pixel value normalization processing on the third depth information of the target face and the fifth color information of the target face.

The foregoing third processing module specifically can be configured to: perform the third processing on the third depth information of the target face and perform the identical third processing on the fifth color information of the target face. Exemplarily, the third processing module can perform linear transformation and affine transformation on the third depth information of the target face via the third transformation sub-module and perform contrast stretching on the third depth information of the target face via the third contrast stretching sub-module, as well as perform the same linear transformation and affine transformation on the fifth color information of the target face via the third transformation sub-module and perform the same contrast stretching on the fifth color information of the target face via the third contrast stretching sub-module. For another example, the third processing module can perform mirroring and linear transformation on the third depth information of the target face via the third transformation sub-module and perform image pixel value normalization processing on the third depth information of the target face via the third normalization processing sub-module, as well as perform the same mirroring and linear transformation on the fifth color information of the target face via the third transformation sub-module and perform the image pixel value normalization processing on the fifth color information of the target face via the third normalization processing sub-module. Optionally, the foregoing third processing module can respectively perform the same third processing on the third depth information (e.g., a depth image) of the target face and an RGB image of the three-dimensional image of the target face, or respectively perform the same third processing on the third depth information of the target face and three channels of the RGB image of the three-dimensional image of the target face.

Optionally, the foregoing feature points may be eye points, or other face features such as a nose tip point and the like. The set position aligned with the feature points of the third depth information of the target face and the fifth color information of the target face may be one or more feature points of a standard face image, e.g., eye points, or a preset position, or feature points in face expression samples that are uniformly aligned when the face expression samples are inputted to the foregoing second neural network during training and feature points in face expression samples that are uniformly aligned when the face expression samples are inputted to the foregoing third neural network during training, e.g., eye points. Optionally, the foregoing set position aligned with the feature points of the third depth information of the target face may be one or more feature points of a standard face image, e.g., eye points, or a preset position, or feature points in face expression samples that are uniformly aligned when the face expression samples are inputted to the foregoing second neural network during training.

Optionally, the foregoing third contrast stretching sub-module specifically can be configured to perform section-by-section contrast stretching on the third depth information of the target face and the fifth color information of the target face according to the characteristics of the three-dimensional image of the target face, or perform section-by-section contrast stretching on pixel values of the third depth information of the target face and the fifth color information of the target face according to the magnitudes of the pixel values.

Optionally, the third normalization processing sub-module specifically can be configured to: normalize pixel values of channels of the third depth information of the target face and the fifth color information of the target face from [0, 255] to [0, 1]. The foregoing channels may comprise third depth information of the target face and three channels of an RGB image of the three-dimensional image of the target face. The third normalization processing sub-module is specifically configured to: normalize pixel values of the third depth information of the target face from [0, 255] to [0, 1].

Generally, using a human face as an example, the three-dimensional image of the target face, which is acquired by the photographic device, comprises redundant parts such as the neck, shoulders and the like in addition to the face, so it needs to be positioned to the face frame position by face detection, then the face is extracted, the above-mentioned face features, e.g., eye points, are positioned, and then the foregoing third processing is performed.

Optionally, the second parameter data is obtained by training fourth depth information of multiple face expression samples via the second neural network, and the third parameter data is obtained by training sixth color information of the multiple face expression samples via the third neural network. Three-dimensional images of the face expression samples comprise fourth depth information of the face expression samples and sixth color information of the face expression samples. It may be parallel that the second neural network trains the fourth depth information to obtain the second parameter data and the third neural network trains the sixth color information to obtain the third parameter data. Specifically, the second input module 502 can respectively input the fourth depth information and the sixth color information of the multiple face expression samples to the foregoing second neural network and third neural network and iterate them, the multiple face expression samples carry face expression categories representing face expression categories, a parameter combination having high expression accuracy for recognizing the face expression samples, e.g., the weight of at least one node of the neural network, is determined as the second parameter data and the third parameter data for recognizing the expression categories of the target face, and the specific content of the second parameter data and the third parameter data can be known by referring to the above description. Optionally, the second parameter data and the third parameter data can be obtained by training the foregoing face expression samples off line, and the product for expression recognition, provided for practical use, may not comprise the foregoing face expression samples.

Because most expressions are compound expressions and may belong to at least one expression category, the face expression categories included by the second neural network and the face expression categories included by the third neural network include at least one of: fear, sadness, joy, anger, disgust, surprise, nature and contempt. Each of the face expression samples, the fourth depth information of the face expression sample and the sixth color information of the face expression sample satisfy (belong to) the same face expression category. The foregoing sixth color information is images of an RGB format or a YUV format. Through the face expression categories carried by the foregoing face expression samples, the second neural network and the third neural network can determine the face expression categories of components (the fourth depth information of the three-dimensional images of the face expression samples and the sixth color information of the three-dimensional images of the face expression samples) of the three-dimensional images of the foregoing face expression samples input to the second neural network and the third neural network, the second neural network can train them to obtain second parameter data corresponding to the foregoing different face expression categories, and the third neural network can train them to obtain third parameter data corresponding to the foregoing different face expression categories.

Optionally, in order to cope with the circumstance that the acquired face expression sample postures are not ideal or the light condition is not ideal, the device comprises a fourth processing module, and the fourth processing module is configured to perform fourth processing on the fourth depth information of the face expression samples, and input the fourth depth information of the face expression samples subjected to the fourth processing to the second input module. The fourth processing module comprises at least one of a fourth rotating sub-module, a fourth transformation sub-module, a fourth alignment sub-module, a fourth contrast stretching sub-module and a fourth normalization processing sub-module. The fourth rotating sub-module is configured to determine feature points of the fourth depth information of the face expression samples, and rotate the fourth depth information of the face expression samples based on the feature points. The fourth transformation sub-module is configured to perform mirroring, linear transformation and affine transformation on the fourth depth information of the face expression samples. The fourth alignment sub-module is configured to align the feature points of the fourth depth information of the face expression samples with a set position. The fourth contrast stretching sub-module is configured to perform contrast stretching on the fourth depth information of the face expression samples. The fourth normalization processing sub-module is configured to perform image pixel value normalization processing on the fourth depth information of the face expression samples.

The fourth processing module is further configured to perform fourth processing on the fourth depth information of the face expression samples and the sixth color information of the face expression samples, and input the fourth depth information of the face expression samples and the sixth color information of the face expression samples subjected to the fourth processing to the second input module. The fourth rotating sub-module is further configured to determine feature points of the fourth depth information of the face expression samples and feature points of the sixth color information of the face expression samples, and rotate the fourth depth information of the face expression samples and the sixth color information of the face expression samples based on the feature points. The fourth transformation sub-module is further configured to perform mirroring, linear transformation and affine transformation on the fourth depth information of the face expression samples and the sixth color information of the face expression samples. The fourth alignment sub-module is further configured to align the feature points of the fourth depth information of the face expression samples and the sixth color information of the face expression samples with a set position. The fourth contrast stretching sub-module is further configured to perform contrast stretching on the fourth depth information of the face expression samples or the sixth color information of the face expression samples. The fourth normalization processing sub-module is further configured to perform image pixel value normalization processing on the fourth depth information of the face expression samples and the sixth color information of the face expression samples. The foregoing fourth processing module may be same as or different from the third processing module.

The fourth processing module specifically can be configured to: perform the fourth processing on the fourth depth information of the face expression samples and perform the identical fourth processing on the sixth color information of the face expression samples. Exemplarily, the fourth processing module specifically can perform linear transformation and affine transformation on the fourth depth information of the face expression samples via the fourth transformation sub-module and perform contrast stretching on the fourth depth information of the face expression samples via the fourth contrast stretching sub-module, as well as perform linear transformation and affine transformation on the sixth color information of the face expression samples via the fourth transformation sub-module and perform contrast stretching on the sixth color information of the face expression samples via the fourth contrast stretching sub-module; or, as another example, perform mirroring and linear transformation on the fourth depth information of the face expression samples via the fourth transformation sub-module and perform image pixel value normalization processing on the fourth depth information of the face expression samples via the fourth normalization processing sub-module, as well as perform mirroring and linear transformation on the sixth color information of the face expression samples via the fourth transformation sub-module and perform image pixel value normalization processing on the sixth color information of the face expression samples via the fourth normalization processing sub-module. Exemplarily, the foregoing fourth processing module specifically can be configured to: respectively perform the same fourth processing on the fourth depth information (e.g., depth images) of the face expression samples and three channels of RGB images of the three-dimensional images of the face expression samples; or perform the fourth processing on the overall images of the three-dimensional images of the face expression samples, then decompose the overall images into the fourth depth information of the face expression samples and the sixth color information of the face expression samples and respectively input them to the second neural network and the third neural network via the second input module 502.

Optionally, the foregoing feature points may be eye points, or other face features such as a nose tip point and the like. The set position aligned with the feature points of the fourth depth information of the face expression samples and the sixth color information of the face expression samples, or the set position aligned with the feature points of the fourth depth information of the face expression samples, as described above, may be one or more feature points of a standard face image, e.g., eye points, or a preset position, or feature points in the face expression samples that are uniformly aligned when the face expression samples are inputted to the foregoing second neural network and the third neural network during training, e.g., eye points.

Optionally, the fourth contrast stretching sub-module specifically can be configured to: perform section-by-section contrast stretching on the fourth depth information of the face expression samples and the sixth color information of the face expression samples according to the characteristics of the fourth depth information of the face expression samples and/or the sixth color information of the face expression samples, or perform section-by-section contrast stretching on pixel values of the fourth depth information of the face expression samples and the sixth color information of the face expression samples according to the magnitudes of the pixel values.

Optionally, the fourth normalization processing sub-module specifically can be configured to: normalize pixel values of the fourth depth information of the face expression samples from [0, 255] to [0, 1]; or, the fourth normalization processing sub-module specifically can be configured to: normalize pixel values of channels of the fourth depth information of the face expression samples and the sixth color information of the face expression samples from [0, 255] to [0, 1]. The foregoing channels may comprise fourth depth information of three-dimensional images of the face expression samples, and three channels of RGB images of the sixth color information of the face expression samples.

Generally, using a human face as an example, the three-dimensional images of the face expression samples, which are acquired by the photographic device, comprise redundant parts such as the neck, shoulders and the like in addition to the face, so it needs to be positioned to the face frame position by face detection, then the face is extracted, the above-mentioned face features, e.g., eye points, are positioned, and then the foregoing fourth processing is performed.

The fifth color information is an image of an RGB format or a YUV format. The sixth color information is images of an RGB format or a YUV format.

The support vector machine parameter data for recognizing the expression category of the target face is obtained by: training the second neural network with the fourth depth information of the facial expression samples, training the third neural network with the sixth color information of the facial expression samples, combining corresponding output data from the second fully-connected layer of the second neural network and the second fully-connected layer of the third neural network as inputs, and training the support vector machine with the inputs and corresponding expression labels of the facial expression samples. Exemplarily, the output data when the second neural network trains the fourth depth information of the multiple face expression samples may be a group of eight-dimensional data, i.e., data for indicating eight expression categories, and the eight expression categories may be fear, sadness, joy, anger, disgust, surprise, nature and contempt. Similarly, the output data when the third neural network trains the sixth color information of the multiple face expression samples is also of eight expression categories, the input of the support vector machine is two groups of eight-dimensional data described above, and because the two groups of eight-dimensional data described above carry face expression categories representing expression categories, the support vector machine data carrying the face expression categories of the expression categories can be trained via the two groups of eight-dimensional data described above.

The method and device for expression recognition, provided by the present invention, can effectively solve the problem that the face expression recognition accuracy declines due to different face postures and different light conditions, and improve the accuracy of face expression recognition of the target face at different face postures and in different light conditions.

Figure 6:
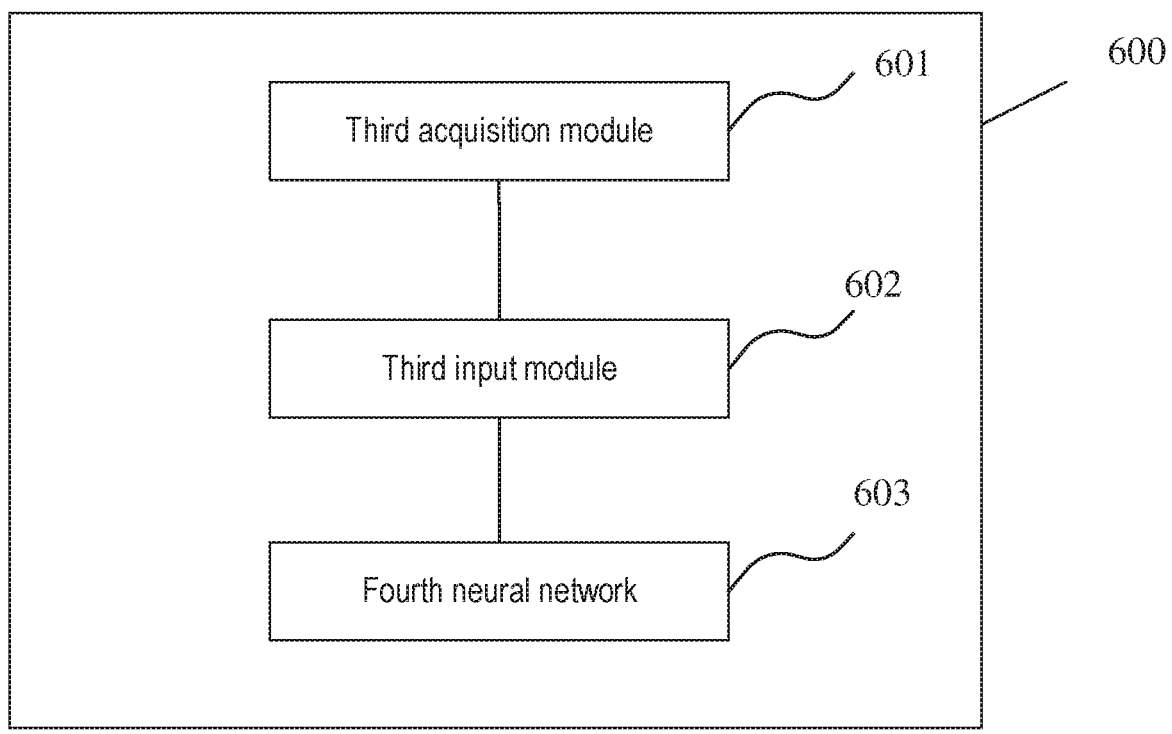
FIG. 6 is a structural schematic diagram of a further device for expression recognition provided by embodiment 6 of the present invention.

A device for expression recognition provided by embodiment 6 of the present invention will be specifically elaborated below in combination with FIG. 6. The device comprises a third acquisition module 601, a third input module 602 and a fourth neural network 603.

The third acquisition module 601 is configured to acquire a three-dimensional image of a target face, the three-dimensional image comprising fifth depth information of the target face and seventh color information of the target face.

Optionally, the third acquisition module 601 can acquire a three-dimensional image of a target face, which is photographed by a photographic device, from a memory. Optionally, the three-dimensional image of the target face described above may be a color image. Optionally, the seventh color information may be an image of an RGB format or a YUV format, or an image of other format that can be converted to and from the foregoing RGB format or YUV format.

The third input module 602 is configured to input the fifth depth information of the target face and the seventh color information of the target face to the fourth neural network. Optionally, input to the fourth neural network may be a depth image of the target face and an RGB image of the three-dimensional image of the target face; input to the fourth neural network may also be a depth image of the target face and three channels of an RGB image of the three-dimensional image of the target face. Optionally, the fourth neural network comprises a fourth convolutional neural network. The fourth convolutional neural network comprises one segmentation layer, eight convolutional layers, eight down-sampling layers, two dropout layers and five fully-connected layers.

The fourth neural network 603 is configured to classify expressions of the target face according to the fifth depth information of the target face, the seventh color information of the target face and a fourth parameter, the fourth parameter comprising at least one face expression category and fourth parameter data for recognizing the expression categories of the target face.

Optionally, because most expressions are compound expressions and may belong to at least one expression category, the fourth neural network may include the fourth parameter, and the face expression categories included by the fourth parameter include at least one of: fear, sadness, joy, anger, disgust, surprise, nature and contempt. Exemplarily, the foregoing fourth parameter may include the face expression categories of eight expression categories of fear, sadness, joy, anger, disgust, surprise, nature and contempt, and fourth parameter data for recognizing the foregoing eight face expression categories, e.g., the weight of at least one node of the fourth neural network. Specifically, the classification results output by the fourth neural network 603 may be probabilities that the target face described above belongs to the foregoing different expression categories respectively, and the sum of the probabilities of belonging to the foregoing different expression categories respectively is 1. The fourth neural network 603 can sequence the output classification results according to the magnitudes of the foregoing probabilities.

Optionally, under the condition that the foregoing fourth parameter includes one face expression category, the fourth neural network can be configured to judge whether the expressions of the target face described above belong to the face expression category included by the fourth parameter.

Optionally, in order to cope with the circumstance that the acquired target face posture is not ideal or the light condition is not ideal, the three-dimensional image of the target face can be processed to approximately meet the requirement of a standard face or the using requirement, specifically, the device further comprises a fifth processing module, and the fifth processing module is configured to perform fifth processing on the three-dimensional image of the target face, and input the three-dimensional image of the target face subjected to the fifth processing to the third input module. The fifth processing module comprises at least one of the following sub-modules: a fifth rotating sub-module, a fifth transformation sub-module, a fifth alignment sub-module, a fifth contrast stretching sub-module and a fifth normalization processing sub-module. The fifth rotating sub-module is configured to determine feature points of the three-dimensional image of the target face, and rotate the three-dimensional image of the target face based on the feature points. The fifth transformation sub-module is configured to perform mirroring, linear transformation and affine transformation on the three-dimensional image of the target face. The fifth alignment sub-module is configured to align the feature points of the three-dimensional image of the target face with a set position. The fifth contrast stretching sub-module is configured to perform contrast stretching on the three-dimensional image of the target face. The fifth normalization processing sub-module is configured to perform image pixel value normalization processing on the three-dimensional image of the target face.

The foregoing fifth processing module specifically can be configured to perform the same fifth processing on the fifth depth information of the target face and the seventh color information of the target face, i.e., perform the fifth processing on the fifth depth information of the target face and perform the identical fifth processing on the seventh color information of the target face. Exemplarily, the foregoing fifth processing module specifically can be configured to: perform linear transformation and affine transformation on the fifth depth information of the target face via the fifth transformation sub-module and perform contrast stretching on the fifth depth information of the target face via the fifth contrast stretching sub-module, as well as perform linear transformation and affine transformation on the seventh color information of the target face via the fifth transformation sub-module and perform contrast stretching on the seventh color information of the target face via the fifth contrast stretching sub-module; or, as another example, perform mirroring and linear transformation on the fifth depth information of the target face via the fifth transformation sub-module and perform image pixel value normalization processing on the fifth depth information of the target face via the fifth normalization processing sub-module, as well as perform mirroring and linear transformation on the seventh color information of the target face via the fifth transformation sub-module and perform image pixel value normalization processing on the seventh color information of the target face via the fifth normalization processing sub-module. Optionally, the foregoing fifth processing module specifically can be configured to: respectively perform the same fifth processing on the fifth depth information (e.g., a depth image) of the target face and three channels of an RGB image of the seventh color information of the target face, or perform the fifth processing on the overall image of the three-dimensional image of the target face, then decompose the overall image into the fifth depth information and the seventh color information and input them to the fourth neural network via the second input module 502.

Optionally, the foregoing feature points may be eye points, or other face features such as a nose tip point and the like. The foregoing set position aligned with the feature points of the three-dimensional image of the target face may be one or more feature points of a standard face image, e.g., eye points, or a preset position, or feature points in face expression samples that are uniformly aligned when the face expression samples are inputted to the foregoing fourth neural network during training, e.g., eye points.

Optionally, the foregoing fifth contrast stretching sub-module specifically can be configured to perform section-by-section contrast stretching on the three-dimensional image of the target face according to the characteristics of the three-dimensional image of the target face, or perform section-by-section contrast stretching on pixel values of the three-dimensional image of the target face according to the magnitudes of the pixel values.

Optionally, the fifth normalization processing sub-module specifically can be configured to normalize pixel values of channels of the three-dimensional image of the target face from [0, 255] to [0, 1]. The foregoing channels may comprise depth information of the three-dimensional image of the target face and three channels of an RGB image of the three-dimensional image of the target face.

Generally, using a human face as an example, the three-dimensional image of the target face, which is acquired by the photographic device, comprises redundant parts such as the neck, shoulders and the like in addition to the face, so it needs to be positioned to the face frame position by face detection, then the face is extracted, the above-mentioned face features, e.g., eye points, are positioned, and then the foregoing fifth processing is performed.

Optionally, the fourth parameter data is obtained by training three-dimensional images of multiple face expression samples via the fourth neural network. The three-dimensional images of the face expression samples comprise sixth depth information of the face expression samples and eighth color information of the face expression samples. Specifically, the sixth depth information and the eighth color information of the multiple face expression samples can be input to the fourth neural network and iterated, the multiple face expression samples carry face expression categories representing face expression categories, the fourth neutral network can determine a parameter combination having high expression accuracy for recognizing the face expression samples, e.g., the weight of at least one node of the neural network, as the fourth parameter for recognizing the expression categories of the target face, and the specific content of the fourth parameter can be known by referring to the above description. Optionally, the fourth parameter can be obtained by training the foregoing face expression samples off line, and the product for expression recognition, provided for practical use, may not comprise the foregoing face expression samples.

Because most expressions are compound expressions and may belong to at least one expression category, each of the face expression samples satisfies (belongs to) at least one of the following face expression categories: fear, sadness, joy, anger, disgust, surprise, nature and contempt. Each of the face expression samples, the sixth depth information of the face expression sample and the eighth color information of the face expression sample satisfy (belong to) the same face expression category. The eighth color information is images of an RGB format or a YUV format. Through the face expression categories carried by the foregoing face expression samples, the fourth neural network can determine the face expression categories of the input components (the sixth depth information of the face expression samples and the eighth color information of the face expression samples are components of the three-dimensional image) of the face expression samples described above, and the fourth neural network can train them to obtain the fourth parameter corresponding to the foregoing different face expression categories.

Optionally, in order to cope with the circumstance that the acquired face expression sample postures are not ideal or the light condition is not ideal, the three-dimensional images of the face expression samples can be processed to approximately meet the requirement of a standard face or the using requirement, specifically, for example, the device further comprises a sixth processing module, and the sixth processing module is configured to perform fifth processing on the three-dimensional images of the face expression samples, and input the three-dimensional images of the face expression samples subjected to the fifth processing to the third input module. The sixth processing module comprises a sixth rotating sub-module, a sixth transformation sub-module, a sixth alignment sub-module, a sixth contrast stretching sub-module and a sixth normalization processing sub-module. The sixth rotating sub-module is configured to determine feature points of the three-dimensional images of the face expression samples, and rotate the three-dimensional images of the face expression samples based on the feature points. The sixth transformation sub-module is configured to perform mirroring, linear transformation and affine transformation on the three-dimensional images of the face expression samples. The sixth alignment sub-module is configured to align the feature points of the three-dimensional images of the face expression samples with a set position. The sixth contrast stretching sub-module is configured to perform contrast stretching of images on the three-dimensional images of the face expression samples. The sixth normalization processing sub-module is configured to perform image pixel value normalization processing on the three-dimensional images of the face expression samples. The foregoing sixth processing module may be same as or different from the fifth processing module.

Optionally, the sixth processing module specifically can be configured to: perform the same sixth processing on the sixth depth information and the eighth color information of the face expression samples, i.e., perform the sixth processing on the sixth depth information of the face expression samples and perform the identical sixth processing on the eighth color information of the face expression samples. Exemplarily, the sixth processing module can perform linear transformation and affine transformation on the sixth depth information of the face expression samples via the sixth transformation sub-module and perform contrast stretching on the sixth depth information of the face expression samples via the sixth contrast stretching sub-module, as well as perform the foregoing linear transformation and affine transformation on the eighth color information of the face expression samples via the sixth transformation sub-module and perform contrast stretching on the eighth color information of the face expression samples via the sixth contrast stretching sub-module; or, as another example, perform mirroring and linear transformation on the sixth depth information of the face expression samples via the sixth transformation sub-module and perform image pixel value normalization processing on the sixth depth information of the face expression samples via the sixth normalization processing sub-module, as well as perform mirroring and linear transformation on the eighth color information of the face expression samples via the sixth transformation sub-module and perform image pixel value normalization processing on the eighth color information of the face expression samples via the sixth normalization processing sub-module. Exemplarily, the foregoing sixth processing module specifically can be configured to: respectively perform the same sixth processing on the sixth depth information (e.g., depth images) of the face expression samples, and three channels of the eighth color information, e.g., RGB images, of the three-dimensional images of the face expression samples; or perform the same sixth processing on the overall images of the three-dimensional images of the face expression samples, then decompose the overall images into the sixth depth information and the eighth color information and input them to the fourth neural network.

Optionally, the foregoing feature points may be eye points, or other face features such as a nose tip point and the like. The foregoing set position aligned with the feature points of the three-dimensional images of the multiple face expression samples may be feature points of a standard face image, e.g., eye points, or a preset position, or feature points in the face expression samples that are uniformly aligned when the face expression samples are inputted to the foregoing fourth neural network during training, e.g., eye points.

Optionally, the foregoing sixth contrast stretching sub-module specifically can be configured to perform section-by-section contrast stretching on the three-dimensional images of the face expression samples according to the characteristics of the three-dimensional images of the face expression samples, or perform section-by-section contrast stretching on pixel values of the three-dimensional images of the face expression samples according to the magnitudes of the pixel values.

Optionally, the sixth normalization processing sub-module is specifically configured to: normalize pixel values of channels of the three-dimensional images of the face expression samples from [0, 255] to [0, 1]. The foregoing channels may comprise the sixth depth information of the three-dimensional images of the face expression samples, and three channels of the eight color information, e.g., RGB images, of the three-dimensional images of the face expression samples.

Generally, using a human face as an example, the three-dimensional images of the face expression samples, which are acquired by the photographic device, comprise redundant parts such as the neck, shoulders and the like in addition to the face, so it needs to be positioned to the face frame position by face detection, then the face is extracted, the above-mentioned face features, e.g., eye points, are positioned, and then the foregoing sixth processing is performed.

The method and device for expression recognition, provided by the present invention, can effectively solve the problem that the face expression recognition accuracy declines due to different face postures and different light conditions, and improve the accuracy of face expression recognition of the target face at different face postures and in different light conditions.

Figure 7:
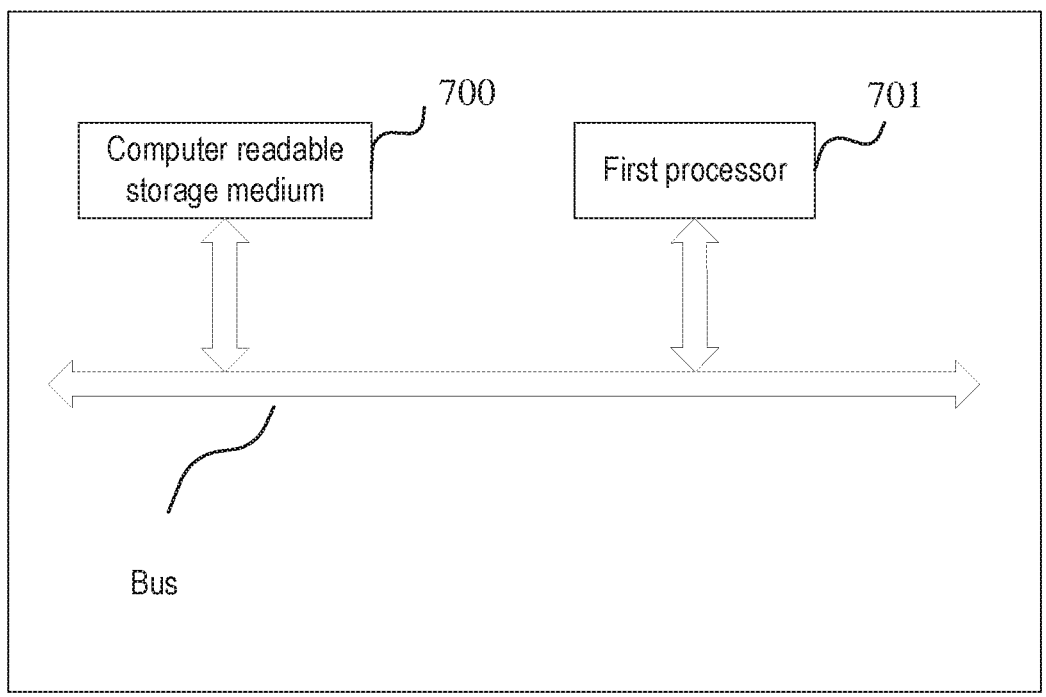
FIG. 7 is a structural schematic diagram of yet another device for expression recognition provided by embodiment 6 of the present invention.

A computer readable storage medium 700 provided by an embodiment of the present invention will be specifically elaborated below in combination with FIG. 7. The computer readable storage medium 700 stores a computer program, and is wherein the computer program, when executed by a first processor 701, implements the steps of the method of any of the foregoing embodiments 1-3.

The computer readable storage medium 700 provided by the present invention can effectively solve the problem that the face expression recognition accuracy declines due to different face postures and different light conditions, and improve the accuracy of face expression recognition of the target face at different face postures and in different light conditions.

Figure 8:
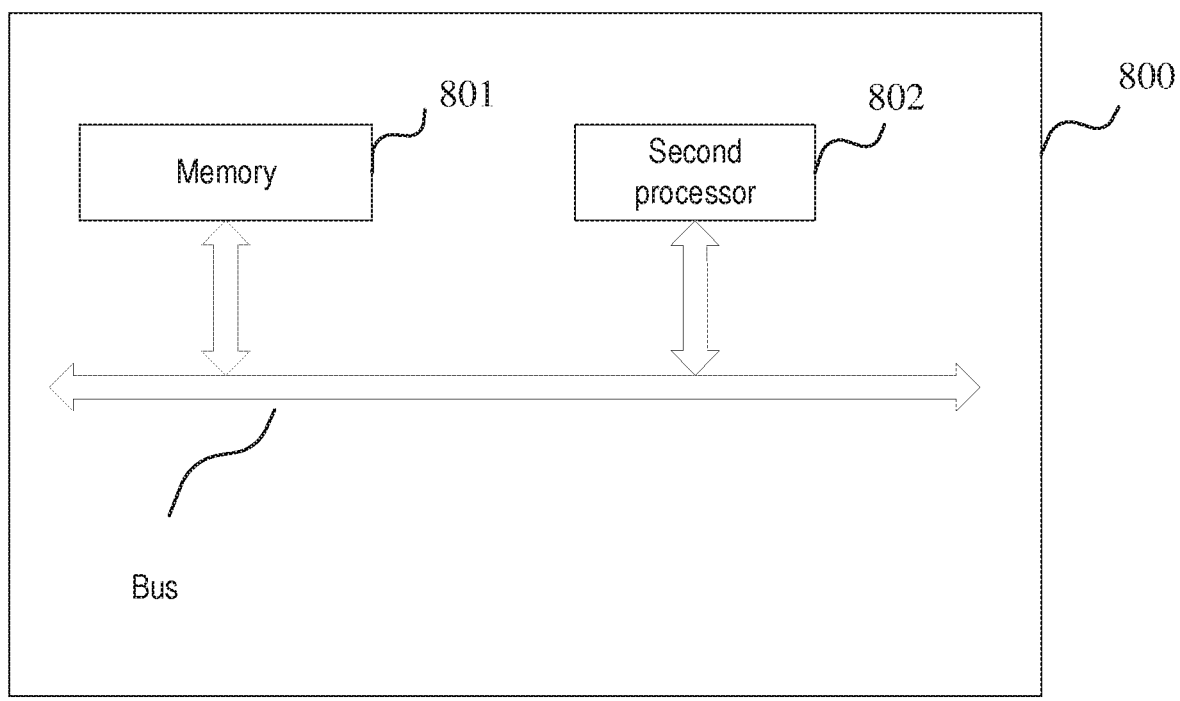
FIG. 8 is a structural schematic diagram of still another device for expression recognition provided by embodiment 6 of the present invention.

A device 800 for expression recognition, provided by an embodiment of the present invention, will be specifically elaborated below in combination with FIG. 8. The device 800 comprises a memory 801, a second processor 802 and a computer program which is stored in the memory 801 and can be run on the second processor 802, and is wherein the computer program, when executed by the second processor 802, implements the steps of the method of any of embodiments 1-3.

The device 800 for expression recognition, provided by the present invention, can effectively solve the problem that the face expression recognition accuracy declines due to different face postures and different light conditions, and improve the accuracy of face expression recognition of the target face at different face postures and in different light conditions.

Exemplarily, the computer program can be segmented into one or more modules/units, and the one or more modules/units are stored in the memory and executed by the processor to accomplish the present invention. The one or more modules/units may be a series of computer program instruction segments which can achieve specific functions, and the instruction segments are used for describing the execution process of the computer program in the device/terminal equipment.

The device/terminal equipment may be computing equipment such as a mobile phone, a tablet computer, a desktop computer, a notebook computer, a palm computer, a cloud server or the like. The device/terminal equipment may include, but not limited to, a processor or a memory. It could be understood by those skilled in the art that the schematic diagrams of the present invention are merely examples of the device/terminal equipment, instead of limiting the device/terminal equipment, which may include more or less components than in the diagrams, or combine some components or different components, e.g., the device/terminal equipment may further include input/output equipment, network access equipment, a bus, etc.

The foregoing processor may be a central processing unit (CPU), and may also be other general processor, a digital signal processor (DSP), an application specific integrated circuit (ASIC), a field-programmable gate array (FPGA) or other programmable logic device, a discrete gate or transistor logic device, a discrete hardware component, etc. The general processor may be a microprocessor or any conventional processor or the like, and the processor is a control center of the device/terminal equipment and connects all parts of the whole device/terminal equipment by using various interfaces and lines.

The memory can be configured to store the computer program and/or modules, and the processor achieves various functions of the device/terminal equipment by running or executing the computer program and/or modules stored in the memory and calling data stored in the memory. The memory may include a program storage area and a data storage area, wherein the program storage area can store an operating system, an application required by at least one function (e.g., image play function, etc.), etc.; and the data storage area can store data (e.g., video data, images, etc.) created according to the use of a mobile phone. Moreover, the memory may include a high-speed random access memory, and may also include a non-volatile memory such as a hard disk, a memory or a plug-in hard disk, a smart media card (SMC), a secure digital (SD) card, a flash card, at least one hard disk storage device, a flash device, or other non-volatile solid-state storage device.

When the modules/units integrated in the device/terminal equipment are implemented in the form of software functional units and sold or used as independent products, they may be stored in a computer readable storage medium. Based on such an understanding, all of or part of processes in the methods of the above-mentioned embodiments of the present invention may also be implemented with a computer program instructing corresponding hardware. The computer program may be stored in a computer readable storage medium. The computer program, when executed by the processor, can implement the steps of the method embodiments described above. The computer program includes computer program codes, which may be in the form of source codes, object codes or executable files, or in some intermediate form, etc. The computer readable medium may include any entity or device which can carry the computer program codes, a recording medium, a U disk, a mobile hard disk, a magnetic disk, an optical disk, a computer memory, a read-only memory (ROM), a random access memory (RAM), an electric carrier signal, an electrical signal, a software distribution medium, etc.

Imaging of the object target object in the embodiments described above may be partial imaging or integral imaging of the target object. Whichever of the partial imaging or the integral imaging, or a corresponding adjustment made to the partial imaging or the integral imaging is adopted is applicable to the method or device provided by the present invention. The foregoing adjustment made by those of ordinary skill in the art without any creative effort shall fall into the protection scope of the present invention.

What is claimed is:

1. A method for expression recognition, comprising
   acquiring a three-dimensional image and a two-dimensional image of a target face, the three-dimensional image comprising first depth information of the target face and first color information of the target face, and the two-dimensional image comprising second color information of the target face;
   inputting the first depth information of the target face and the first color information and the second color information of the target face into one or more neural networks; and
   classifying an expression of the target face according to the first depth information of the target face, the first color information of the target face, the second color information of the target face, and a first parameter by using the one or more neural networks, the first parameter comprising at least one facial expression category and first parameter data for recognizing an expression category of the target face.

2. The method according to claim 1, wherein before inputting the first depth information of the target face, the first color information of the target face, and the second color information of the target face into the one or more neural networks, the method further comprises performing a same processing on the three-dimensional image of the target face and the two-dimensional image of the target face, the processing comprising at least one of:
- determining feature points of the three-dimensional image of the target face and the two-dimensional image of the target face, and rotating the three-dimensional image of the target face and the two-dimensional image of the target face based on the feature points;
- performing mirroring, linear transformation, and affine transformation on the three-dimensional image of the target face and the two-dimensional image of the target face;
- aligning the feature points of the three-dimensional image of the target face and the two-dimensional image of the target face with a set position;
- performing contrast stretching on the three-dimensional image of the target face and the two-dimensional image of the target face; and
- performing pixel value normalization on the three-dimensional image of the target face and the two-dimensional image of the target face.

3. The method according to claim 2, wherein the performing pixel value normalization on the three-dimensional image of the target face and the two-dimensional image of the target face comprises normalizing pixel values of each channel of the three-dimensional image of the target face and the two-dimensional image of the target face from [0, 255] to [0, 1].

4. The method according to claim 1, wherein:
- the first parameter data for recognizing the expression category of the target face is obtained by training the one or more neural networks with three-dimensional images of facial expression samples and two-dimensional images of the facial expression samples;
- the three-dimensional images of the facial expression samples comprise second depth information of the facial expression samples and second color information of the facial expression samples; and
- the two-dimensional images of the facial expression samples comprise third color information of the facial expression samples.

5. The method according to claim 4, wherein before training the one or more neural networks with the three-dimensional images of the facial expression samples and the two-dimensional images of the facial expression samples, the method further comprises performing a same processing on the three-dimensional images of the facial expression samples and the two-dimensional images of the facial expression samples, the processing comprising at least one of:
- determining feature points of the three-dimensional images of the facial expression samples and the two-dimensional images of the facial expression samples, and rotating the three-dimensional images of the facial expression samples and the two-dimensional images of the facial expression samples based on the feature points;
- performing mirroring, linear transformation, and affine transformation on the three-dimensional images of the facial expression samples and the two-dimensional images of the facial expression samples;
- aligning the feature points of the three-dimensional images of the facial expression samples and the two-dimensional images of the facial expression samples with a set position;
- performing contrast stretching on the three-dimensional images of the facial expression samples and the two-dimensional images of the facial expression samples; and
- performing pixel value normalization on the three-dimensional images of the facial expression samples and the two-dimensional images of the facial expression samples.

6. The method according to claim 5, wherein the performing pixel value normalization on the three-dimensional images of the facial expression samples and the two-dimensional images of the facial expression samples comprises normalizing pixel values of each channel of the three-dimensional images of the facial expression samples and the two-dimensional images of the facial expression samples from [0, 255] to [0, 1].

7. The method according to claim 5, wherein:
- each facial expression sample has at least one of the following facial expression categories: fear, sadness, joy, anger, disgust, surprise, nature and contempt;
- each facial expression sample, the second depth information of the facial expression sample, the second color information of the facial expression sample, and the third color information of the facial expression sample have the same facial expression category.

8. The method according to claim 2, wherein the facial expression categories included in the one or more neural networks comprise at least one of: fear, sadness, joy, anger, disgust, surprise, nature and contempt.

9. The method according to claim 2, wherein the feature points are eye points.

10. The method according to claim 1, wherein the one or more neural networks comprise a convolutional neural network.

11. The method according to claim 10, wherein the convolutional neural network comprises four convolutional layers, four down-sampling layers, one dropout layer, and two fully-connected layers.

12. The method according to claim 2, wherein the first color information and the second color information are images of an RGB format or a YUV format.

13. The method according to claim 4, wherein the second color information and the third color information are images of an RGB format or a YUV format.

14. The method according to claim 1, wherein:
- the inputting comprises inputting the first depth information of the target face to a first neural network and inputting the first color information of the target face to a second neural network;
- the classifying comprises:
  - classifying the expression of the target face according to the first depth information of the target face and a first parameter, and outputting first classification data by the first neural network, and
  - classifying the expression of the target face according to the first color information of the target face and a second parameter, and outputting second classification data by the second neural network, the second parameter comprising the at least one facial expression category and second parameter data for recognizing the expression category of the target face; and the outputting comprises outputting a classification result on the expression of the target face according to the first classification data and the second classification data.

15. The method according to claim 14, wherein the outputting a classification result on the expression of the target face according to the first classification data and the second classification data comprises:
inputting the first classification data and the second classification data into a support vector machine; and
outputting the classification result on the expression of the target face according to the first classification data, the second classification data, and support vector machine parameter data by the support vector machine, the support vector machine comprising the at least one facial expression category and support vector machine parameter data for recognizing the expression category of the target face.

16. The method according to claim 15, wherein before inputting the first depth information of the target face to the first neural network and inputting the first color information of the target face to the second neural network, the method further comprises performing a first processing on the first depth information or the first color information of the target face, the first processing comprising at least one of:
determining feature points of the first depth information or the first color information of the target face, and rotating the first depth information or the first color information of the target face based on the feature points;
performing mirroring, linear transformation, and affine transformation on the first depth information or the first color information of the target face;
aligning the feature points of the first depth information or the first color information of the target face with a set position;
performing contrast stretching on the first depth information or the first color information of the target face; and
performing pixel value normalization on the first depth information or the first color information of the target face.

17. The method according to claim 16, wherein performing pixel value normalization on the first depth information of the target face comprises normalizing pixel values of each channel of the first depth information or the first color information of the target face from [0, 255] to [0, 1].

18. The method according to claim 15, wherein:
the first parameter data is obtained by training the first neural network with second depth information of facial expression samples; and
the second parameter data is obtained by training the second neural network with second color information of the facial expression samples.

19. The method according to claim 18, wherein before training the first neural network with the second depth information of the facial expression samples or training the second neural network with the second color information, the method further comprises performing a second processing on the second depth information or the second color information of the facial expression samples, the second processing comprising at least one of:
determining feature points of the second depth information or the second color information of the facial expression samples, and rotating the second depth information or the second color information of the facial expression samples based on the feature points;
performing mirroring, linear transformation, and affine transformation on the second depth information or the second color information of the facial expression samples;
aligning the feature points of the second depth information or the second color information of the facial expression samples with a set position;
performing contrast stretching on the second depth information or the second color information of the facial expression samples; and
performing pixel value normalization on the second depth information or the second color information of the facial expression samples.

20. The method according to claim 19, wherein the performing pixel value normalization on the second depth information of the facial expression samples comprises normalizing pixel values of the second depth information or the second color information of the facial expression samples from [0, 255] to [0, 1].

21. The method according to claim 18, wherein the support vector machine parameter data for recognizing the expression category of the target face is obtained by:
training the first neural network with the second depth information of the facial expression samples;
training the second neural network with the second color information of the facial expression samples;
combining corresponding data output from a second fully-connected layer of the first neural network and a second fully-connected layer of the second neural network as inputs; and
training the support vector machine with the inputs and corresponding expression labels of the facial expression samples.

22. The method according to claim 18, wherein
each facial expression sample has at least one of the following facial expression categories: fear, sadness, joy, anger, disgust, surprise, nature, and contempt; and
each facial expression sample, the second depth information of the facial expression sample, and the second color information of the facial expression sample have the same facial expression category.

23. The method according to claim 14, wherein the facial expression categories included in the first neural network and the second neural network include at least one of: fear, sadness, joy, anger, disgust, surprise, nature, and contempt.

24. The method according to claim 16, wherein the feature points are eye points.

25. The method according to claim 14, wherein the first neural network comprises a first convolutional neural network, and the second neural network comprises a second convolutional neural network.

26. The method according to claim 25, wherein:
the first convolutional neural network comprises three convolutional layers, three down-sampling layers, one dropout layer, and two fully-connected layers; and
the second convolutional neural network comprises four convolutional layers, four down-sampling layers, one dropout layer, and two fully-connected layers.

27. The method according to claim 14, wherein the first color information is an image of an RGB format or a YUV format.

28. The method according to claim 18, wherein the second color information is images of an RGB format or a YUV format.

29. The method according to claim 1, wherein:
the inputting comprises inputting the first depth information of the target face and the first color information of the target face to the one or more neural networks; and
the classifying comprises classifying the expression of the target face according to the first depth information of the target face, the first color information of the target face, and a first parameter by the neural network.

30. The method according to claim 29, wherein before inputting the first depth information of the target face and the first color information of the target face to the one or more neural networks, the method further comprises performing a first processing on the three-dimensional image of the target face, the first processing comprising at least one of:
determining feature points of the three-dimensional image of the target face, and rotating the three-dimensional image of the target face based on the feature points;
performing mirroring, linear transformation, and affine transformation on the three-dimensional image of the target face;
aligning the feature points of the three-dimensional image of the target face with a set position;
performing contrast stretching on the three-dimensional image of the target face; and
performing pixel value normalization on the three-dimensional image of the target face.

31. The method according to claim 30, wherein the pixel value normalization on the three-dimensional image of the target face comprises normalizing pixel values of each channel of the three-dimensional image of the target face from [0, 255] to [0, 1].

32. The method according to claim 29, wherein:
the first parameter data is obtained by training three-dimensional images of facial expression samples via the one or more neural networks; and
the three-dimensional images of the facial expression samples comprise second depth information of the facial expression samples and second color information of the facial expression samples.

33. The method according to claim 32, wherein before the three-dimensional images of the facial expression samples are trained via the one or more neural networks, the method further comprises performing a second processing on the three-dimensional images of the facial expression samples, the second processing comprising at least one of:
determining feature points of the three-dimensional images of the facial expression samples, and rotating the three-dimensional images of the facial expression samples based on the feature points;
performing mirroring, linear transformation, and affine transformation on the three-dimensional images of the facial expression samples;
aligning the feature points of the three-dimensional images of the facial expression samples with a set position;
performing contrast stretching on the three-dimensional images of the facial expression samples; and
performing pixel value normalization on the three-dimensional images of the facial expression samples.

34. The method according to claim 33, wherein the pixel value normalization on the three-dimensional images of the facial expression samples comprises normalizing pixel values of each channel of the three-dimensional images of the facial expression samples from [0, 255] to [0, 1].

35. The method according to claim 32, wherein:
each facial expression sample has at least one of the following facial expression categories: fear, sadness, joy, anger, disgust, surprise, nature and contempt; and
each facial expression sample, the second depth information of the facial expression samples, and the second color information of the facial expression samples have the same facial expression category.

36. The method according to claim 29, wherein the facial expression categories included in the one or more neural networks comprise at least one of: fear, sadness, joy, anger, disgust, surprise, nature and contempt.

37. The method according to claim 30, wherein the feature points are eye points.

38. The method according to claim 29, wherein the fourth neural network comprises a fourth convolutional neural network.

39. The method according to claim 38, wherein the convolutional neural network comprises one segmentation layer, eight convolutional layers, eight down-sampling layers, two dropout layers, and five fully-connected layers.

40. The method according to claim 29, wherein the second color information is an image of an RGB format or a YUV format.

41. The method according to claim 32, wherein the second color information is images of an RGB format or a YUV format.

42. A non-transitory computer readable storage medium, which stores a computer program, wherein the computer program, when executed by a first processor, implements the steps of the method of claim 1.

43. A device for expression recognition, comprising a memory, a second processor and a computer program which is stored in the memory and can be run on the second processor, wherein the computer program, when executed by the second processor, implements the steps of the method of claim 1.

44. A device for expression recognition, characterized by comprising:
one or more neural networks;
an acquisition module configured to acquire a three-dimensional image and a two-dimensional image of a target face, the three-dimensional image comprising first depth information of the target face and first color information of the target face, and the two-dimensional image comprising second color information of the target face;
an input module configured to input the first depth information of the target face and the first color information and the second color information of the target face to the one or more neural networks; and
wherein the one or more neural networks are configured to classify an expression of the target face according to the first depth information of the target face, the first color information of the target face, the second color information of the target face, and a first parameter, the first parameter comprising at least one face expression category and first parameter data for recognizing an expression category of the target face.

* * * * *